(12) United States Patent
Meyvaert

(10) Patent No.: US 12,166,422 B2
(45) Date of Patent: Dec. 10, 2024

(54) DC VOLTAGE CONVERTERS

(71) Applicant: Lion Semiconductor Inc., San Francisco, CA (US)

(72) Inventor: Hans Meyvaert, Leuven (BE)

(73) Assignee: Lion Semiconductor Inc., San Francisco, CA (US)

( * ) Notice: Subject to any disclaimer, the term of this patent is extended or adjusted under 35 U.S.C. 154(b) by 0 days.

(21) Appl. No.: 18/548,401

(22) PCT Filed: Mar. 24, 2022

(86) PCT No.: PCT/GB2022/050744
§ 371 (c)(1),
(2) Date: Aug. 30, 2023

(87) PCT Pub. No.: WO2022/200800
PCT Pub. Date: Sep. 29, 2022

(65) Prior Publication Data
US 2024/0146194 A1    May 2, 2024

Related U.S. Application Data

(63) Continuation of application No. 17/212,651, filed on Mar. 25, 2021, now Pat. No. 11,342,844.

(51) Int. Cl.
*H02M 3/158*    (2006.01)
*G05F 1/613*    (2006.01)
(Continued)

(52) U.S. Cl.
CPC ............ *H02M 3/158* (2013.01); *G05F 1/613* (2013.01); *H02J 1/082* (2020.01); *H02M 1/009* (2021.05)

(58) Field of Classification Search
CPC ...... H02M 3/158; H02M 3/1584; H02M 3/38; H02M 1/009; H02M 1/0095; H02J 1/082;
(Continued)

(56) References Cited

U.S. PATENT DOCUMENTS

| 5,729,163 A | 3/1998 | McCleary et al. |
| 2006/0145748 A1 | 7/2006 | Ki et al. |

(Continued)

OTHER PUBLICATIONS

International Search Report and Written Opinion of the International Searching Authority, International Application No. PCT/GB2022/050744, mailed Jun. 29, 2022.
(Continued)

*Primary Examiner* — Nguyen Tran
(74) *Attorney, Agent, or Firm* — Jackson Walker L.L.P.

(57) ABSTRACT

This application relates to methods and apparatus for DC voltage conversion. A DC converter (100) is described, with a charge pump circuit comprising a plurality of charge pump stages (1401, 1402-1, 1402-2) each charge pump stage comprising connections for respective first and second capacitors for that stage (C1A, C1B; C2A, C2B; C3A, C3B). The charge pump also has a switch network, wherein the switch network comprises, between each successive stage, four switching paths (S7AA, S7AB, S7Ba, S7BB; S6AA, S6AB, S6Ba, S6BB) for separately connecting a respective first electrode of each of the first and second capacitors of one stage to a first electrode either of the first and second capacitors of the preceding stage, so that the relevant capacitor of the one stage can be charged by the relevant capacitor of the preceding stage.

16 Claims, 14 Drawing Sheets

(51) Int. Cl.
*H02J 1/08* (2006.01)
*H02M 1/00* (2006.01)

(58) Field of Classification Search
CPC .... H02J 1/10; G05F 1/613; G05F 1/61; G05F 1/607
See application file for complete search history.

(56) References Cited

U.S. PATENT DOCUMENTS

| | | |
|---|---|---|
| 2006/0176102 A1* | 8/2006 | Ayres .................... H02M 3/073 |
| | | 327/536 |
| 2006/0244513 A1 | 11/2006 | Yen et al. |
| 2011/0068857 A1 | 3/2011 | Ucciardello et al. |
| 2012/0200340 A1* | 8/2012 | Shook ..................... H02M 3/07 |
| | | 327/536 |
| 2015/0280696 A1 | 10/2015 | Bernacchia et al. |
| 2018/0062507 A1* | 3/2018 | Giuliano ................. H02M 3/07 |
| 2021/0013798 A1 | 1/2021 | Giuliano |
| 2021/0057992 A1 | 2/2021 | Shah et al. |

OTHER PUBLICATIONS

Tan Yi et al., "A Discrete-Time Model for Frequency Modulated Charge Pumps with Synchronized Controller", 2020 IEEE 63rd International Midwest Symposium On Circuits and Systems, IEEE, Aug. 9, 2020, pp. 929-932.

Luo Zhicong et al., "Regulated Charge Pump with New Clocking Scheme for Smoothing the Charging Current in Low Voltage CMOS Process", IEEE Transactions On Circuits and Systems I: Regular Papers, IEEE, US, vol. 64, No. 3, Mar. 1, 2017, pp. 528-536.

\* cited by examiner

DC VOLTAGE CONVERTERS

The present application is a 371 of International Patent Application No. PCT/GB2022/050744, filed Mar. 24, 2022, which claims priority to U.S. patent application Ser. No. 17/212,651, filed Mar. 25, 2021, now U.S. Pat. No. 11,342,844, issued May 24, 2022, each of which is incorporated by reference herein in its entirety.

BACKGROUND

The field of representative embodiments of this disclosure relates to methods, apparatus and/or implementations concerning or relating to DC voltage converters, and in particular to charge pump converters.

DC voltage converters are widely used for a variety of applications. For example, DC voltage converters can be used to provide DC voltage regulators, provide DC-to-DC converters, and provide battery chargers (such as with mobile telephones and other mobile devices).

Some DC voltage converters may comprise a charge pump converter, for example based on the known Dickson charge pump design. Such charge pump converters may comprise a plurality of stages configured to provide a successive step-up or step-down of an input voltage to provide an output voltage.

In general, especially for battery powered devices, power efficiency is an important consideration and thus there is a general desire to reduce power losses.

SUMMARY

Embodiments of the present disclosure relate to improved DC voltage converters, and in particular to improved charge pump converters.

According to an aspect of the disclosure there is provided a voltage converter comprising:
- a charge pump circuit comprising a plurality of charge pump stages, each charge pump stage comprising connections for respective first and second capacitors for that stage;
- the charge pump comprising a switch network, wherein the switch network comprises, between each successive stage, four switching paths for separately connecting a respective first electrode of each of the first and second capacitors of one stage to a first electrode either of the first and second capacitors of the preceding stage, so that the relevant capacitor of the one stage can be charged by the relevant capacitor of the preceding stage.

Each of said four switching paths between each successive stage may comprise a single switch.

The voltage converter may be operable to repeatedly cycle through a sequence of phases such that, in one phase one of the first or second capacitors of one of the charge pump stages is charged by one of the first and second capacitors of the preceding stage at a first charging voltage and, in the next phase, is charged by the other of the first and second capacitors of the preceding stage at a second, higher, charging voltage. In some cases, the voltage converter may be operable to repeatedly cycle through a repeating sequence of phases comprising first to fourth phases. In the first phase, the first capacitor of one of the charge pump stages may be charged by the second capacitor of the preceding stage and the second capacitor of that one charge pump stage may provide an output for that one stage, whilst the first capacitor of the preceding stage may be charged by an input to that preceding stage. In the second phase, the first capacitor of said one charge pump stage may provide an output for that one charge pump stage and the second capacitor of that one charge pump stage may be charged by the second capacitor of the preceding stage, whilst the first capacitor of the preceding stage may be charged by an input to that preceding stage. In the third phase, the first capacitor of said one charge pump stage may provide an output for that one charge pump stage and the second capacitor of that one charge pump stage may be charged by the first capacitor of the preceding stage, whilst the second capacitor of that preceding stage may be charged by an input to that preceding stage. In the fourth phase, the first capacitor of said one charge pump stage may be charged by the first capacitor of the preceding stage and the second capacitor may provide an output for that one charge pump stage, whilst the second capacitor of that preceding stage may be charged by an input to that preceding stage.

The number of charge pump stages may be M, e.g. a positive integer, and the voltage converter may be configured to be operable in a first mode of operation to provide a conversion ratio between an input voltage and an output voltage of (M+1):1 or 1:(M+1), e.g. a step-down or step-up conversion ratio. In some implementations, the voltage converter may be further configured to be operable in one or more additional modes of operation, with different conversion ratios in said different modes. The conversion ratio in the, or each, of said one or more additional modes may be X:1 or 1:X where X is an integer between 2 and M.

In the first mode of operation, the voltage converter may be configured to cycle through a repeated sequence of four phases at first cycle frequency. In one of the additional modes of operation, with a conversion ratio of 2:1 or 1:2, the voltage converter may be configured to cycle through a repeated sequence of two phases with the same first cycle frequency.

In some implementations, the voltage converter may be configured, such that, in one of the one or more additional modes of operation, the voltage converter is operable in a sequence of phases and the first and second capacitors of at least one of the charge pump stages are connected in connection paths that do not vary throughout said sequence of phases. Additionally or alternatively, the voltage converter may be configured, such that, in one of the one or more additional modes of operation, the voltage converter is operable in a sequence of phases and at least two of the charge pump stages are connected in each of the phases so that the respective first and second capacitors of those phase are connected in parallel throughout said sequence of phases.

The voltage converter may further comprise a switch controller for controlling switching of the switch network to implement a mode of operation.

The switch network may comprise: first and second input switches for selectively connecting a voltage input to the first electrodes of the first and second capacitors respectively of a first one of the plurality of charge pump stages; and first and second output switches for selectively connecting the first electrodes of the first and second capacitors respectively of a last one of the plurality of charge pump stages to a voltage output. The switch network may further comprise respective switches for selectively connecting a second electrode of each of the first and second capacitors of each of the plurality of stages to either of a first node at a defined voltage or to a second node which is coupled to one of the voltage input or the voltage output.

Embodiments also relate to the voltage converter comprising said first and second capacitors of each charge pump stage, e.g. with integrated capacitors or with non-integrated capacitors connected to the charge pump.

The voltage converter may be implemented as an integrated circuit.

Embodiments also relate to an electronic device comprising the voltage converter of any of the embodiments described herein.

It should be noted that, unless expressly indicated to the contrary herein or otherwise clearly incompatible, then any feature described herein may be implemented in combination with any one or more other described features.

For a better understanding of examples of the present disclosure, and to show more clearly how the examples may be carried into effect, reference will now be made, by way of example only, to the following drawings in which.

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments of the disclosure relate to DC voltage converters, and in particular to switched capacitor or charge pump converters.

Figure 1:
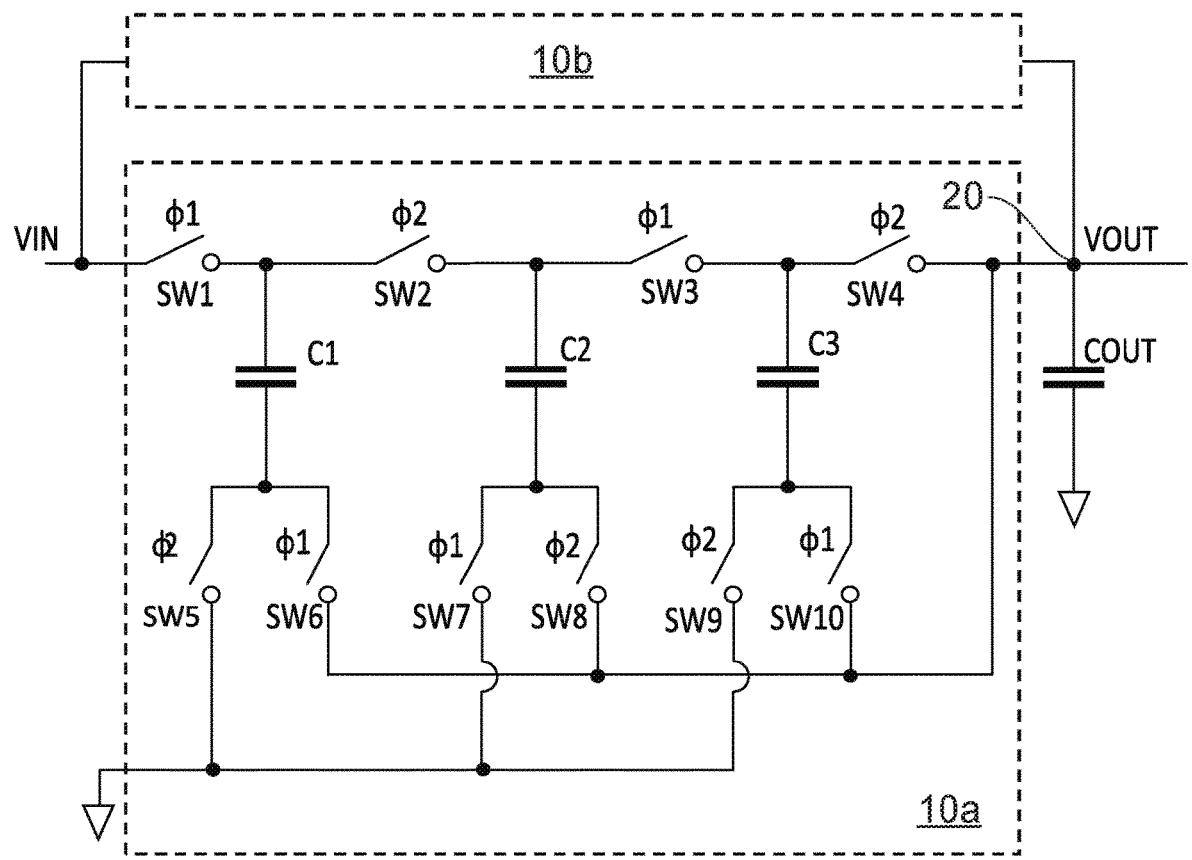
FIG. 1 illustrates one example of a known voltage converter.

FIG. 1 illustrates one type of known charge pump converter, which may be referred to as a Dickson charge pump. The converter comprises a charge pump 10a which, in this example, is a multi-stage charge pump with three successive stages, each stage having a respective flying capacitor C1, C2 and C3. The charge pump 10a receives an input voltage VIN. A first electrode of the capacitor C1 of the first stage can be selectively connected to the input voltage VIN by switch SW1 or to a first electrode of the capacitor C2 of the second stage by switch SW2. The first electrode of the capacitor C2 can be switchably connected to a first electrode of capacitor C3 of the third stage by switch SW3 and the first electrode of capacitor C3 of the third stage can be switchably connected to the output 20 of the charge pump by switch SW4.

In general, the first electrode of the flying capacitor of each stage can be seen as being selectively switched to either receive a charging input (which, for the first stage, is the input voltage VIN and which, for the rest of the stage is the output of the preceding stage) or to provide an output from that stage (which, for all but the last stage is to the subsequent stage and which, for the last stage, is to the converter output 20).

An output capacitor, COUT, is connected to the output 20 to maintain the output voltage VOUT at the output. The second electrode of each of the flying capacitors C1, C2 and C3 may be selectively switched between the output 20 and a defined voltage, in this example ground.

In use, the charge pump 10a can be switched between two different switch states in two respective phases. For each of the charge pump stages, in one phase the first electrode of the flying capacitor of that stage is connected to receive a charging input for the stage whilst the second electrode of the flying capacitor is connected to the output voltage VOUT, and in the other phase the first electrode of the capacitor is connected to provide an output from the stage whilst the second electrode is connected to the defined voltage, e.g. ground. The odd numbered stages are switched in phase with one another and in antiphase with the even numbered stages, i.e. the odd numbered stages receive a charging input whilst the even numbered stages provide an output and vice-versa.

Thus, in the example of FIG. 1, in a first phase $\phi 1$, switches SW1 and SW3 are closed (with switches SW2 and SW4) open, so that the capacitors C1 and C3 of the first and third stages each receive a respective charging input and the capacitor C2 of the second stage provides a charging output (to the third stage). Switches SW6 and SW10 are closed (with SW5 and SW9) open to connect the second electrodes of capacitors C1 and C3 to the output voltage VOUT, whilst switch SW7 is closed (with switch SW8) open, to connect the second electrode of capacitor C2 to ground. In the second phase, $\phi 2$, switches SW2 and SW4 are closed (with SW1 and SW3 open) so that the first and third stage are switched to provide outputs, with the second stage receiving a charging input from the first stage. In this second phase $\phi 2$ the second electrodes of capacitors are connected to ground by switches SW5 and SW9 respectively, whilst the second electrode of capacitor C2 is connected to the output voltage VOUT by switch SW8.

By repeatedly operating in these two phases, the output voltage will, in this example, be generated as nominally being equal to VIN/4, although in practice the output voltage will be lower than VIN/4 by a small amount due to operation of the converter and power losses. Effectively, as the flying capacitor of each stage is charged by a voltage input for that stage whilst the second electrode of the capacitor is connected to the voltage output, the flying capacitor of each stage is charged to a voltage which is less than the input to that by stage by an amount equal to the output voltage VOUT. As each stage is charged by the preceding stage, the nominal voltage of the flying capacitor of each successive stage thus reduces by an amount equal to the output voltage, i.e. the flying capacitor C1 of the first stage is charged to a nominal voltage of VIN-VOUT, the flying capacitor C2 of the second stage is charged to a nominal voltage of VIN-2*VOUT and so on. The voltage of the flying capacitor of the last stage defines the output voltage, which means that, in general, for a voltage converter with M active stages, the nominal output voltage will be equal to VOUT/(M+1), but, as mentioned, in practice the actual output voltage will be lower than this nominal amount by a small amount. It will also be understood that the output voltage will, in practice with a load current demand, exhibit a voltage ripple due to the operation in the two phases.

The converter could be implemented with just the charge pump 10a, in which case it will be understood that the output capacitor COUT would be charged by C3 during phase $\phi 2$, and would maintain the output voltage in phase $\phi 0$. In some implementations, however, an additional charge pump 10b, with same structure as the charge pump 10a could be additionally coupled between the input voltage VIN and converter output 20 and operated in antiphase with charge pump 10a, i.e. so that when charge pump 10a is in a switch state with the odd numbered stages provide an output and the even numbered stages receiving a charging input, the charge pump 10b is in a switch state with the odd numbered stages receive a charging input and the odd number stages provide an output, and vice versa. In such an implementation, the voltage converter can be considered to be a multi-stage converter where each stage comprises two flying capacitors, i.e. the first stages of the charge pumps 10a and 10b collectively provide a first stage of the converter. The converter is operated in two phases and, in each phase, one of the flying capacitors of a stage is switched to receive a charging input whilst the other flying capacitor of the stage provides an output. Such an arrangement may be beneficial in terms of achieving a desired performance, e.g. to meet a maximum load current demand whilst maintaining an acceptable limit of voltage ripple of the output voltage VOUT and/or switching frequency for the phases.

FIG. 1 illustrates a step-down converter for generating an output voltage VOUT which has a magnitude lower than that of the input voltage VIN, e.g. where the output voltage VOUT is a fraction of the input voltage VIN. It will be understood by one skilled in the art that if, instead, the second electrodes of capacitors C1, C2 and C3 were selectively connected to the input voltage VIN, rather than the output voltage, by respective switches SW6, SW8 and SW10, the converter would operate as a step-up converter for providing an output voltage VOUT with a greater magnitude than the input voltage VIN, e.g. the nominal output voltage VOUT may be a multiple of the input voltage.

Embodiments of the present disclosure relate to improved DC voltage converters. These DC voltage converters can be used for any suitable purpose in some embodiments. For example, in some embodiments, these DC voltage converters can be used to implement voltage regulators, to implement DC-to-DC converters, to implement battery chargers, and/or for any other suitable purpose.

DC converters of the present disclosure may comprise multi-stage charge pumps, where at least one stage comprises at least two flying capacitors, wherein the flying capacitors of one stage can be used to charge a flying capacitor of a subsequent stage in a sequence of at least two charging phases and the charging is sequenced so as to minimise capacitor conduction losses.

Figure 2:
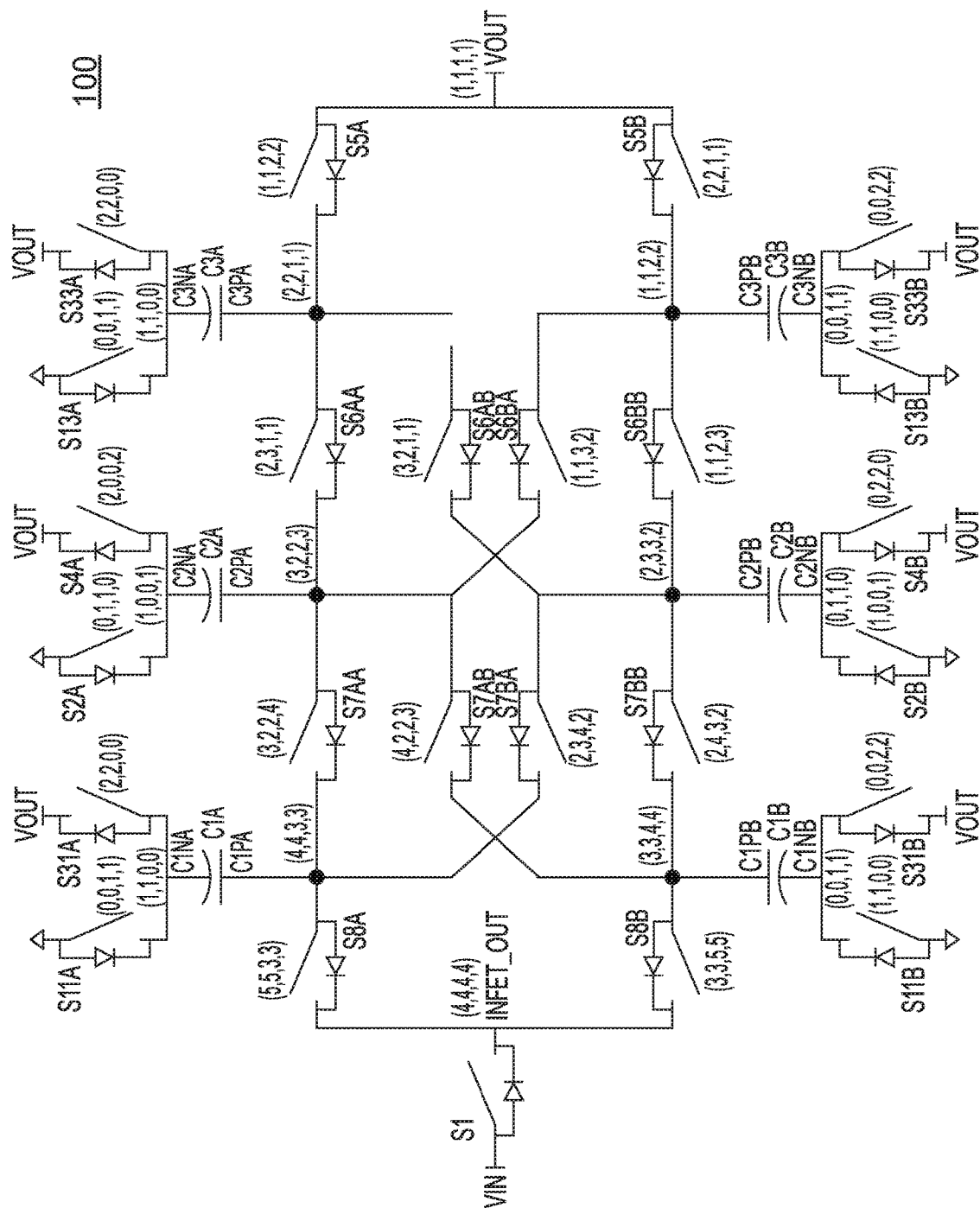
FIG. 2 illustrates a voltage converter according to an embodiment.

FIG. 2 illustrates an example 100 of a DC voltage converter according to an embodiment. As shown, voltage converter 100 in this example includes switches S1, S11A, S31A, S2A, S4A, S13A, S33A, S8A, S7AA, S6AA, S5A, S7AB, S7BA, S6AB, S6BA, S8B, S7BB, S6BB, S5B, S11B, S31B, S2B, S4B, S13B, and S33B (each of which can have an inherent diode (as shown) based on the process technology used in some embodiments) and capacitors C1A, C2A, C3A, C1B, C2B, and C3B.

Any suitable switches can be used as switches S1, S11A, S31A, S2A, S4A, S13A, S33A, S8A, S7AA, S6AA, S5A, S7AB, S7BA, S6AB, S6BA, S8B, S7BB, S6BB, S5B, S11B, S31B, S2B, S4B, S13B, and S33B. For instance, the switches may be implemented by suitable transistors. It should be noted that all of these switches need not be of the same type. For example, in some embodiments, one or more of these switches can be formed from N-type MOSFETs and/or one or more of the switches may be formed from P-type MOSFETs.

Any suitable capacitors, of any suitable size, can be used as capacitors C1A, C2A, C3A, C1B, C2B, and C3B. It should be noted that these capacitors need not be of the same type or size, although in some embodiments the capacitors could conveniently be of the same type and size as one another. In some embodiments, at least some of these capacitors could be integrated with the switches as part of an integrated circuit and may, for example, comprise on-chip MOS capacitors. In some embodiments, however, the capacitors could be off-chip components, for example Multi-Layer Ceramic Capacitors (MLCC), in which case the DC voltage converter circuit may comprise suitable connections for connecting the capacitors, e.g. nodes for connecting to terminals of the capacitors and hence to the capacitor electrodes. The capacitance values may be selected according to the output power specification for a particular application, e.g. to provide a desired performance, with large capacitance values for a higher output power. In some applications, the capacitors could have capacitance values in the range of about 1 nF to 1 mF inclusive.

Switch S1 selectively connects an input voltage VIN to the rest of the converter. S1 can be used to perform a variety of functions in some embodiments. For example, in some embodiments, S1, when on, can be used as a resistor to measure the amount of current flowing from VIN. As another example, S1 can be used to protect the entire converter against certain over voltage or over current events by turning S1 OFF to prevent damage of the converter. In some embodiments, S1 can be omitted when not needed or desirable.

The voltage converter 100 can be seen as having a first stage with flying capacitors C1A and C1B, a second stage with flying capacitors C2A and C2B and a third stage with flying capacitors C3A and C3B. It will be understood however that the other embodiments may have a different number of stages.

For the first stage, comprising capacitors C1A and C1B, a first electrode of each of the flying capacitors C1A and C1B can be selectively connected to the input voltage VIN (via switch S1), by respective switches S8A and S8B. Each of the first electrodes of capacitors C1A and C1B can also be selectively switched, independently, to each of first electrodes of the capacitors C2A and C2B of the second stage. Thus, the first electrode of capacitor C1A can be connected to the first electrode of capacitor C2A by switch S7AA and independently to the first electrode of capacitor C2B by switch S7BA. Likewise, the first electrode of capacitor C1B can be connected to the first electrode of capacitor C2A by switch S7AB and independently to the first electrode of capacitor C2B by switch S7BB. Similarly, the first electrodes of each of capacitors C2A and C2B can also be selectively switched, independently, to the first electrodes of each of the capacitors C3A and C3B of the second stage. The first electrodes of the capacitors C3A and C3B may also be selectively connected to the output VOUT by respective switches S5A and S5B.

In use, an output capacitor (not separately illustrated) may be connected to the converter output and may, for instance be connected between the converter output and a defined voltage, e.g. ground.

The second electrodes of all of the flying capacitors can be selectively connected to either a defined voltage, in this example ground, or (for a step-down converter) to the charge pump output VOUT. Note that, FIG. 2 illustrates the second electrode of each flying capacitor may be connected to a separate output VOUT, but it will be understood that these outputs are all connected to one another and to the charge pump output.

It will be understood that the switch arrangement of the DC voltage converter 100 of FIG. 2 is similar to that of the converter described with reference to FIG. 1, however the converter 100 includes additional switches S7AB, S7BA, S6AB and S6BA. It can thus be seen that there are four independent switching paths between successive stages of the multi-stage converter. Thus, as noted above, the first electrode of capacitor C1A can be connected to the first electrode of capacitor C2A by switch S7AA or to the first electrode of capacitor C2B by switch S7BA, and likewise the first electrode of capacitor C1B can be connected to the first electrode of capacitor C2A by switch S7AB or the electrode of capacitor C2B by switch S7BB. These switches provide switching paths that are separate from one another and allow for independent connection of the relevant capacitors and which, in this example, each comprise just a single switch. As illustrated in FIG. 2, the switch connections can be seen as comprising two 'inline' switches, e.g. S7AA and S7BB for connecting capacitors of the same half of the converter, e.g. top or bottom as illustrated, and also two 'crossover' switches for connecting the flying capacitors of the opposite halves.

In use, the voltage converter is switched sequentially through four phases p1-p4, as respectively illustrated in FIGS. 3 to 6. In the phases illustrated in FIGS. 3 to 6, different connection paths for current flow/charging are established as illustrated by the arrows, and it will be understood that switches in the relevant paths are closed in the illustrated phase.

Figure 3:
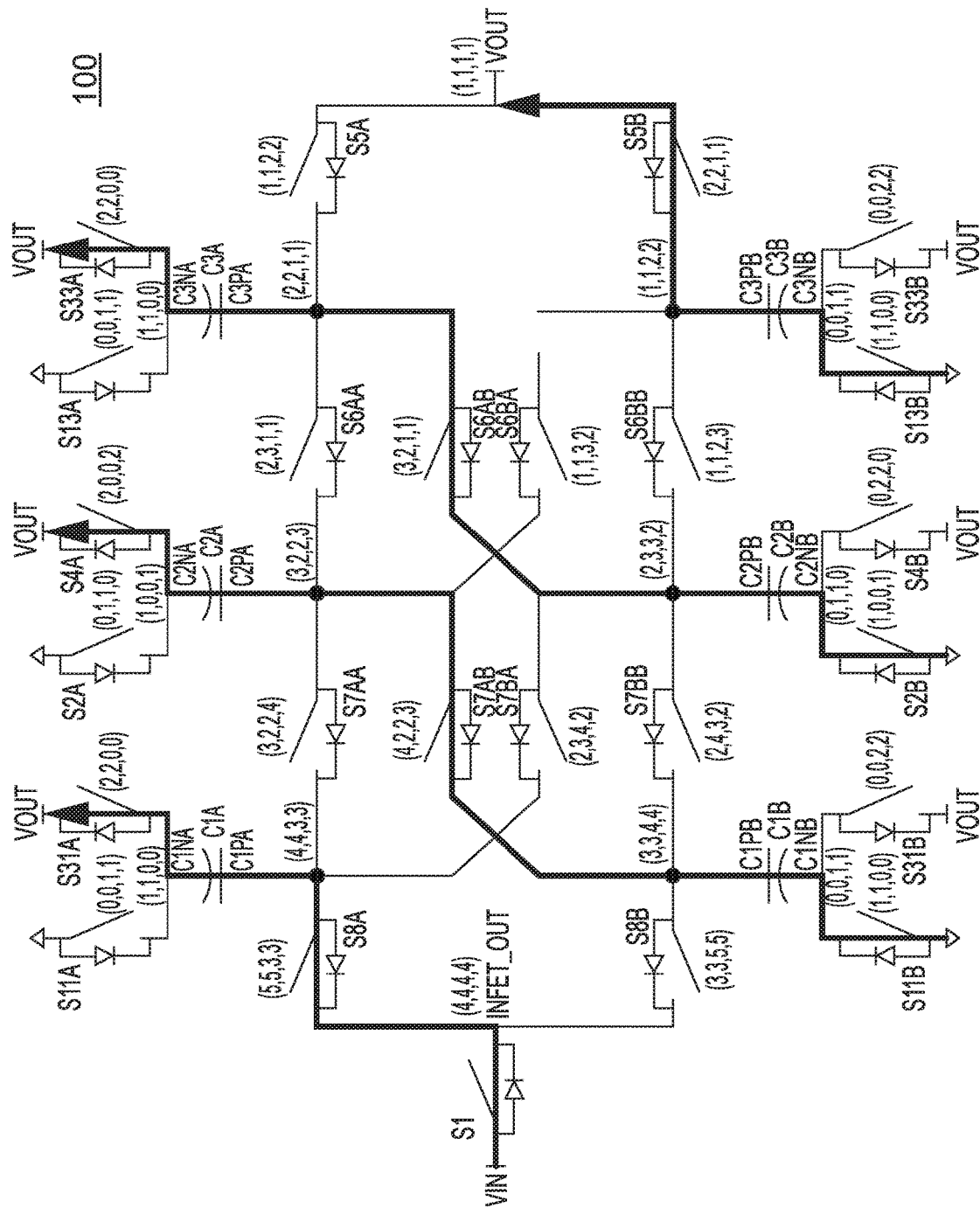
FIGS. 3-6 illustrate four phases of operation of the converter of FIG. 2 in one mode of operation.

As shown in FIG. 3, during phase p1, the switches are controlled to provide four different connection paths for the converter. In the phase p1, a first electrode of capacitor C1A of the first stage is connected to the input voltage VIN via switch S8A (and switch S1), whilst a second electrode of this capacitor C1A is connected to VOUT by switch S31A. Capacitor C1A of the first stage is thus arranged to receive a charging input from the input voltage VIN. Meanwhile the other capacitor C1B of the first stage is arranged to provide an output to the second stage, in this case for the capacitor C2A of the second stage, which is switched to receive a charging input. The first electrode of capacitor C1B is thus connected to the first electrode of capacitor C2A by switch S7AB. The second electrode of capacitor C1B is connected to ground by switch S11B and the second electrode of capacitor C2A is connected to VOUT by switch S4A.

Likewise, switches S2B, S6AB and S33A are closed so that the capacitor C2B of the second stage provides an output for the third stage, which is received as a charging input for capacitor C3A of the third stage. Switches S13B and S5B are closed so that capacitor C3B of the third stage provides an output to the output of the voltage converter.

Figure 4:
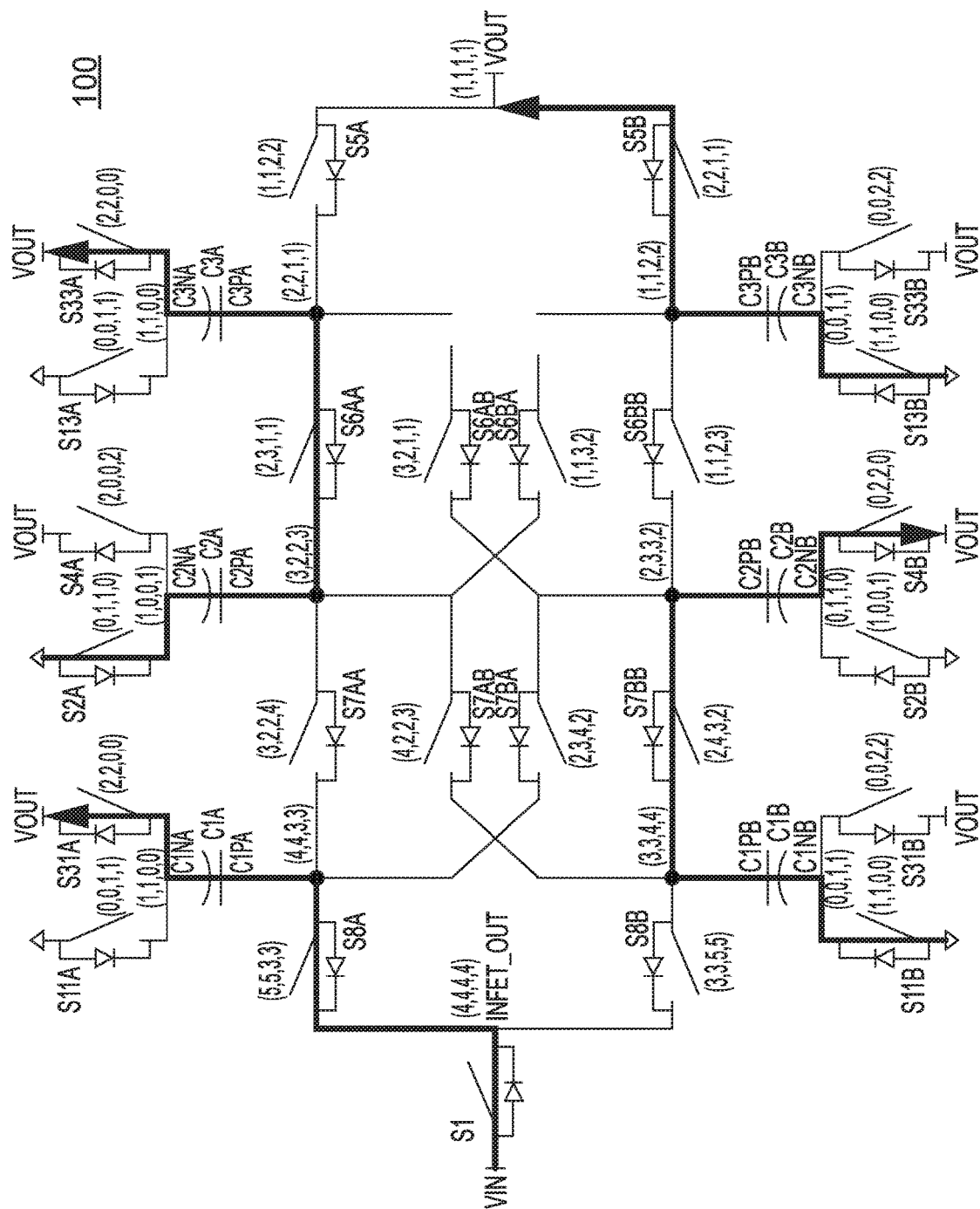

As shown in FIG. 4, in phase p2, capacitor C1A remains arranged in same connection path as in phase p1, with switches S8A and S31A (and S1) closed, so that this capacitor C1A again receives VIN as a charging input. Capacitor C1B of the first stage is again arranged to provide an output for the second stage, but in this phase p2 is connected to provide a charging input for capacitor C2B of the second stage, with switches S11B, S7BB and S4B closed. In this phase, capacitor C2A of the second stage is arranged to provide a charging output for capacitor C3A of the third stage, with switches S2A, S6AA and S33A closed and the other capacitor C3B of the third stage remains arranged in same connection path as in phase p1, with switches S13B and S5B closed.

Figure 5:
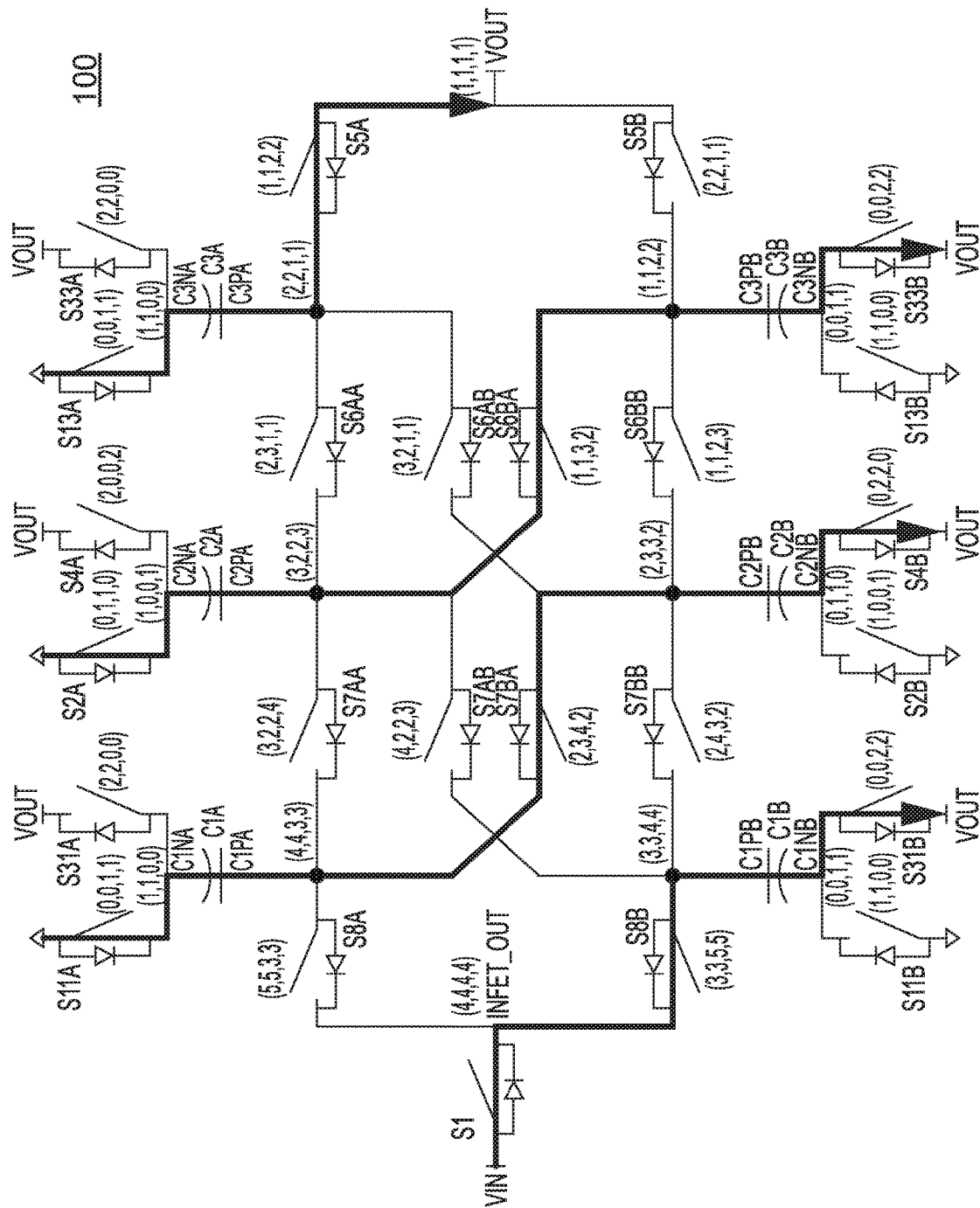

As shown in FIG. 5, during phase p3, capacitor C1B of the first stage is arranged to receive the input voltage VIN as a charging input, with switches S8B and S31B (and S1) closed. In this phase p3, capacitor C1A of the first stage is arranged to provide an output to the second stage, in this phase for the capacitor C2B of the second stage, which is arranged to receive a charging input. The first electrode of capacitor C1A is thus connected to the first capacitor of capacitor C2B by switch S7BA. The second electrode of capacitor C1A is connected to ground by switch S11A and the second electrode of capacitor C2B is connected to VOUT by switch S4B. In this phase p3, switches S2A, S6BA and S33B are closed so that the capacitor C2A of the second stage provides as output for the third stage, which is received as a charging input for capacitor C3B of the third stage. Switches S13A and S5A are closed so that capacitor C3A of the third stage provides an output to the output of the voltage converter.

Figure 6:
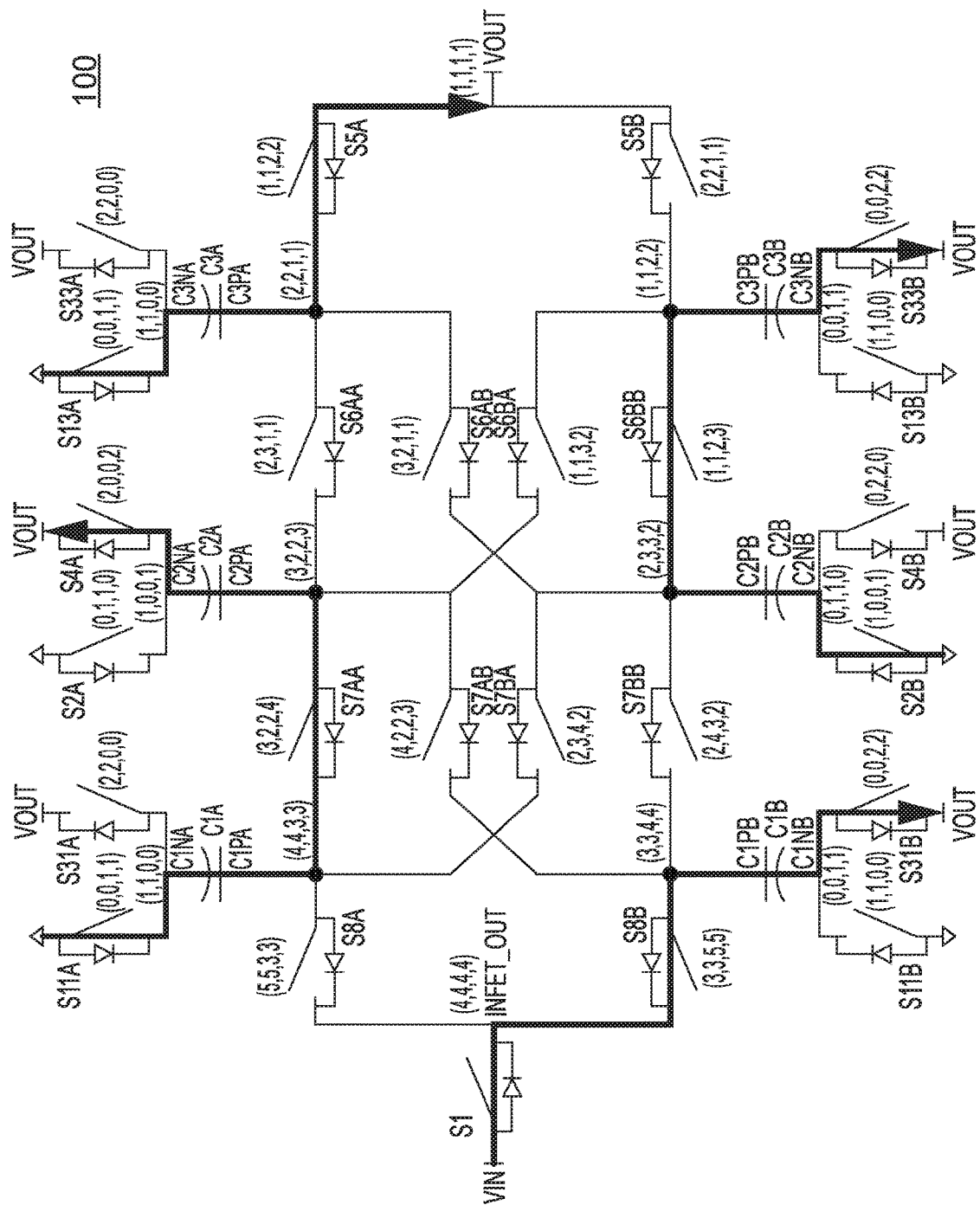

As shown in FIG. 6, in phase p4, capacitor C1B remains arranged in same connection path as in phase p3, with switches S8B and S31B (and S1) closed, so that this capacitor C1B receives VIN as a charging input. Capacitor C1A of the first stage is again arranged to provide an output for the second stage, but in this phase p4 is connected to provide a charging input for capacitor C2A of the second stage, with switches S11A, S7AA and S4A closed. In this phase, capacitor C2B of the second stage is arranged to provide a charging output for capacitor C3B of the third stage, with switches S2B, S6BB and S33B closed and the other capacitor C3A of the third stage remains switched in same connection path as in phase p3, with switches S13B and S5B closed.

During operation, the switches of converter 100 are thus driven ON or OFF during each of phases p1-p4 as shown in TABLE 1 below. Any suitable drive signals can be used to control the switches to be ON or OFF during any phase. For example, in some embodiments, when the switches are implemented using N-type MOSFETs, the switches can be driven by drive signals having values equal to the voltage multipliers shown after the colon in TABLE 1 multiplied by the value of VOUT. For example, if VOUT is 1 volt, switch S31A can be driven by a 2 volts DC signal during phase p1. As another example, if VOUT is 2 volts DC, switch S8A can be driven by a 10 volts DC signal during phase p2. While specific voltage multipliers are shown in TABLE 1, it should be understood that other voltages are possible in some embodiments.

TABLE 1

| Switch | p1 | p2 | p3 | p4 |
|---|---|---|---|---|
| S1 | ON:5 | ON:5 | ON:5 | ON:5 |
| S11A | OFF:0 | OFF:0 | ON:1 | ON:1 |
| S31A | ON:2 | ON:2 | OFF:0 | OFF:0 |
| S2A | OFF:0 | ON:1 | ON:1 | OFF:0 |
| S4A | ON:2 | OFF:0 | OFF:0 | ON:2 |
| S13A | OFF:0 | OFF:0 | ON:1 | ON:1 |
| S33A | ON:2 | ON:2 | OFF:0 | OFF:0 |
| S8A | ON:5 | ON:5 | OFF:3 | OFF:3 |
| S7AA | OFF:3 | OFF:2 | OFF:2 | ON:4 |
| S6AA | OFF:2 | ON:3 | OFF:1 | OFF:1 |
| S5A | OFF:1 | OFF:1 | ON:2 | ON:2 |
| S7AB | ON:4 | OFF:2 | OFF:2 | OFF:3 |
| S7BA | OFF:2 | OFF:3 | ON:4 | OFF:2 |
| S6AB | ON:3 | OFF:2 | OFF:1 | OFF:1 |
| S6BA | OFF:1 | OFF:1 | ON:3 | OFF:2 |
| S8B | OFF:3 | OFF:3 | ON:5 | ON:5 |
| S7BB | OFF:2 | ON:4 | OFF:3 | OFF:2 |
| S6BB | OFF:1 | OFF:1 | OFF:2 | ON:3 |
| S5B | ON:2 | ON:2 | OFF:1 | OFF:1 |
| S11B | ON:1 | ON:1 | OFF:0 | OFF:0 |
| S31B | OFF:0 | OFF:0 | ON:2 | ON:2 |
| S2B | ON:1 | OFF:0 | OFF:0 | ON:1 |
| S4B | OFF:0 | ON:2 | ON:2 | OFF:0 |

TABLE 1-continued

| Switch | p1 | p2 | p3 | p4 |
|---|---|---|---|---|
| S13B | ON:1 | ON:1 | OFF:0 | OFF:0 |
| S33B | OFF:0 | OFF:0 | ON:2 | ON:2 |

By repeatedly operating in these four phases, the voltage converter of FIG. 2 can generate an output voltage VOUT which has a nominal value of, in this example, VIN/4, less a small amount $V_{66}$.

TABLE 2 shows example of the nominal voltages, expressed in multiples of VOUT, that can be observed at the various nodes (as labelled in FIG. 2) in converter 100 during different phases of operation in some embodiments. For example, for a VOUT of 2 volts DC, a voltage of 2 volts DC can be observed during phase p1 at node C1NA, in some embodiments. As another example, for a VOUT of 1 volt DC, a voltage of 4 volts DC can be observed during phase pi at node C1PA, in some embodiments. While specific voltage multipliers are shown in TABLE 2, it should be understood that other voltages are possible in some embodiments.

TABLE 2

| Node | p1 | p2 | p3 | p4 |
|---|---|---|---|---|
| C1NA | 1 | 1 | 0 | 0 |
| C2NA | 1 | 0 | 0 | 1 |
| C3NA | 1 | 1 | 0 | 0 |
| C1PA | 4 | 4 | 3 | 3 |
| C2PA | 3 | 2 | 2 | 3 |
| C3PA | 2 | 2 | 1 | 1 |
| INFET_OUT | 4 | 4 | 4 | 4 |
| C1PB | 3 | 3 | 4 | 4 |
| C2PB | 2 | 3 | 3 | 2 |
| C3PB | 1 | 1 | 2 | 2 |
| C1NB | 0 | 0 | 1 | 1 |
| C2NB | 0 | 1 | 1 | 0 |
| C3NB | 0 | 0 | 1 | 1 |

In a similar manner as discussed with reference to FIG. 1, the flying capacitors of each stage are switched to either be charged by an input voltage, i.e. the input voltage VIN for the first stage or the output of the preceding stage, or switched to provide an output, e.g. to a subsequent stage or, for the last stage, to the converter output. When the relevant flying capacitor is being charged, the second electrode of that capacitor is connected to the output VOUT, whereas when a flying capacitor is connected to provide an output from that stage, the second electrode is connected to the defined voltage, i.e. ground in this example. Thus, each flying capacitor is charged to a nominal voltage which is lower than the input voltage by an amount equal to VOUT, and the output voltage VOUT is defined by the voltage of the flying capacitor of the last stage. For a converter with M active switching stages, the nominal output voltage is thus VIN/(M+1).

In embodiments of the disclosure, however, the capacitors of the second and any subsequent stage are charged over two consecutive phases by different capacitors of the preceding phase. By appropriate sequencing of the charging, an initial voltage difference between the relevant connected capacitors can be reduced, which can reduce power losses, compared to charging the flying capacitor (with a similar overall amount of charge transfer) in one continuous charging phase.

One source of power loss in a switched capacitor voltage converter is capacitor conduction losses (sometimes referred to as charge sharing losses). Such losses, which result from charge movement to/from the capacitors, have a dependence on the voltage applied to the capacitor. Where two capacitors are connected to share charge, e.g. where a first capacitor is used to provide charging of a second capacitor, the magnitude of the initial voltage difference between the connected electrodes of the first and second capacitors will thus have an impact on the capacitor conduction losses, with a greater voltage difference leading to greater losses.

It will be understood that when a first flying capacitor of one stage is connected to provide charging of a second flying capacitor of a subsequent stage, charge will flow from the first flying capacitor to the second flying capacitor to tend to equalize the voltage at the connected electrodes. The flow of charge from the first flying capacitor to the second flying capacitor will thus result, over the duration of the phase, in a drop in the voltage at the first electrode of the first flying capacitor and a rise in the voltage at the first electrode of the second flying capacitor until (if the charging phase is of sufficient duration) these voltages equalize.

As noted above, the flying capacitors of the second and subsequent stages are each charged in two successive phases, by different ones of the flying capacitors of the preceding stage, and the flying capacitors of all but the last stage are used, in two successive phases, to provide a charging output to different ones of the flying capacitors of the subsequent phase. The sequencing of these phase is controlled in a way that reduces the initial voltage difference between the connected electrodes of the flying capacitors compared to using a single continuous charging phase.

A flying capacitor which has been charged over both of the preceding two phases can be seen as being at a high charge (and hence high voltage) level. When such a flying capacitor is then used to provide a charging output for the next phase, some charge will be transferred from that flying capacitor, and thus, at the end of that phase, the relevant flying capacitor can be seen as being at a first intermediate charge (and voltage) level. When that flying capacitor is then again used, in the next phase, to provide a charging output, further charge may be transferred from the capacitor and thus at the end of that second output phase, the flying capacitor may be seen as being in a low charge (and voltage) state. That flying capacitor is then recharged over the next two phases, but in the first one of these charging phases it is charged by a capacitor of the preceding stage that has already been used to provide an output in the preceding phase and which thus starts at an intermediate charge (and voltage) level. In the second of the charging phases, the first flying capacitor (which has now been charged to an intermediate voltage level) is charged by the other of the flying capacitors of the preceding stage which is in the high voltage state.

For example, flying capacitor C2A of the second stage is used to provide an output to the third stage in phases p2 and p3, and is then recharged in phase p4 and phase p1 of the next cycle. At the end of phase p1, and therefore at the beginning of phase p2, the flying capacitor C2A is thus at a high charge level. In phase p2, the first electrode of capacitor C2A is connected to the first electrode of capacitor C3A, which was, in the previous phase p1 charged to an intermediate charge level by capacitor C2B. Over the course of phase p2, charge may flow from capacitor C2A to C3A, charging C3A to its high charge level. In phase p3, the first electrode of capacitor C2A, which thus starts the phase at an intermediate charge level (for that stage), is connected to the first electrode of capacitor C3B, which provided an output in each of the two previous phases, and which thus starts at a low charge level. Capacitor C3B is thus charged to an intermediate charge level for it, whilst capacitor C2A ends phase p3 in (what is for it) a low charge state. In phase p4, the first electrode of capacitor C2A is switched to receive a charging input and is connected to the first electrode of capacitor C1A, which is at an intermediate charge level. Capacitor C2A is thus charged over phase p4 to an intermediate charge level for it. In phase p1 of the next cycle the first electrode of capacitor C1A is connected to the first electrode of capacitor C1B, which is at a high charge level and capacitor C2A is charged back to its high charge level.

It can thus be seen that a flying capacitor, of the second or subsequent stage, which is in a low charge (and hence low voltage) state is initially charged by an intermediate input voltage (provided by one of the flying capacitors of the preceding stage). The flying capacitor is then further charged, by a higher input voltage (provided by the other flying capacitor of the preceding stage). By charging the capacitor in two stages in this way, the voltage difference is limited to the difference between the intermediate input voltage and the low voltage state of the capacitor being charged or the high voltage input and an intermediate voltage state of the capacitor being charged. Were, instead, the flying capacitor to be charged in a single continuous charging stage (with a similar overall amount of charge transfer), as would be the case for the converter discussed with reference to FIG. 1, the high voltage input would be applied to the flying capacitor in the low voltage state, which would result in a greater voltage difference with greater associated capacitor conduction losses.

Such a charging arrangement may be referred to as soft-charging and/or as multiphase charging.

Note that the terms high, intermediate and low used herein in relation to charge and voltage levels are used in a relative sense and do not imply anything about the absolute values of such charge or voltage levels. It will also be understood that an intermediate charge/voltage for one stage may correspond to the high charge/voltage for the subsequent stage.

It will further be understood that for the first stage, which receives the input voltage VIN as a charging input, there is only a single voltage level available as an input and thus the benefits of multi-phase charging can't be applied to the charging of the capacitors of the first stage. As seen in FIGS. 2-5, when the flying capacitors of the first stage are being charged, they may remain connected to the input voltage for two successive phases. Likewise, for the last stage, there is only a single output and benefits of multi-phase charging can't be applied to the output from the capacitors of the last stage. When the flying capacitors of the last stage are providing an output, they may remain connected to the output for two successive phases. As such, the benefits of multi-phase charging could not be achieved in a single stage converter, e.g. a Dickson type converter with just one active switching stage for generating a nominal output voltage of VIN/2.

Some embodiments of the present disclosure thus provide a DC voltage converter with a charge pump having a plurality of charge pump stages, where each stage comprises, in use, first and second flying capacitors. The charge pump also has a switch network configured such that each of the first and second capacitors of a stage can be selectively connected to a charging input for the stage or to provide a charging output from the stage. In use, the DC voltage converter is switched in a sequence of four phases such that the capacitors of the second and subsequent stages are charged in successive phases by different flying capacitors of the preceding stage so as to benefit from lower capacitor conduction losses. To enable such operation, between successive stages there are four separate switching paths for selectively connecting either of the flying capacitors of one stage to either of the flying capacitors of the subsequent stage. This allows for the connections between the capacitors to be established by a single switch, i.e. each of the four switching paths can comprise just one switch, which can be efficient in terms of circuit area and switching losses in use.

Note that whilst the DC voltage converter 100 of FIG. 2 is operable in the four phases p1 to p4 to implement multi-phase charging, in some implementations the DC voltage converter could instead be operated in just two phases without multi-phase charging. For instance, if the DC voltage converter were just operated in a sequence comprising phases p2 and p4, the DC voltage converter would operate in a similar manner to that discussed with reference to FIG. 1. In some instances, it may be beneficial for the DC voltage converter to be configurable so as to operate in the four phases p1 to p4 with multi-phase charging or in just two phases without multi-phase charging. A controller, not illustrated in FIG. 2, may thus be configured to control operation of the DC voltage converter accordingly, as will be discussed in more detail below.

The DC voltage converter of FIG. 2 comprises two flying capacitor per stage and can charge a flying capacitor of the second or subsequent stage in two successive phases using the two flying capacitors of the preceding stage. This principle could be extended to a greater number of flying capacitors per stage. For instance, with three flying capacitors per stage, the flying capacitors of the second and subsequent stages could be charged over three consecutive phases by the three flying capacitors of the preceding stage. In this case the sequencing would be arranged so that the flying capacitor, when at a low charge level would be charged to a first intermediate charge level in one phase, before being charged to a second, higher, intermediate charge level in the next phase and then finally to a high charge level in the third phase, with the charging being supplied from flying capacitors starting at a first intermediate charge level, a second, higher, intermediate charge level and a high charge level respectively. In order words, a flying capacitor of a stage may be charged in a plurality of phases by different flying capacitors of a preceding stage which start at increasing charge/voltage levels in each successive charging phase. To allow for this operation there may be a separate switching path between the first electrode of each flying capacitor of one stage and the first electrode of each flying capacitor of the subsequent stage. For j flying capacitors per stage, this would involve $j^2$ switching paths between successive stages.

FIG. 2 illustrates a DC voltage converter with three stages, but other embodiments may have a different number of stages.

In some applications, the DC voltage converter may be operable to have a reconfigurable conversion ratio, i.e. the ratio between the input voltage and the output voltage may be controllably reconfigurable. For example, the converter 100 described with reference to FIG. 2 has three stages and is operable to generate a nominal output voltage of VIN/4, i.e. the converter is operable with a 4:1 (step-down) conversion ratio. However, the converter could also be operable, in at least one other mode of operation, to provide a conversion ratio of 3:1 and/or 2:1.

To provide the variable conversion ratio, in some examples, the flying capacitors of one or more of the stages may be connected in a particular connection path which is maintained throughout the sequence of phases in that operating mode. As such the relevant stage does not act as an active switching stage and that stage thus does not provide a contribution to the conversion ratio.

For example, FIGS. 7 to 10 illustrate four phases of operation p1a-p4a respectively of the DC voltage converter in a mode with a 3:1 conversion ratio, i.e. for generating an output voltage equal to VIN/3 less a small voltage $V_{66}$. In this mode of operation, the capacitors C1A and C1B of the first stage are each arranged in a connection path between the input voltage VIN and the defined voltage, ground in this example, and this connection path is maintained throughout the four phases of operation p1a to p4a, as illustrated by the connections of the dashed lines in FIGS. 7 to 10. Thus, switches S8A, S8B, S11A and S11B (together with switch S1 when present) are closed (ON) in all four phases of operation in this mode.

In this example, capacitors C1A and C1B thus effectively act as a single input capacitance, which is charged to the input voltage. This effectively disables the first stage from being a switching stage and means that the input to the second stage will be the input voltage VIN.

Figure 7:
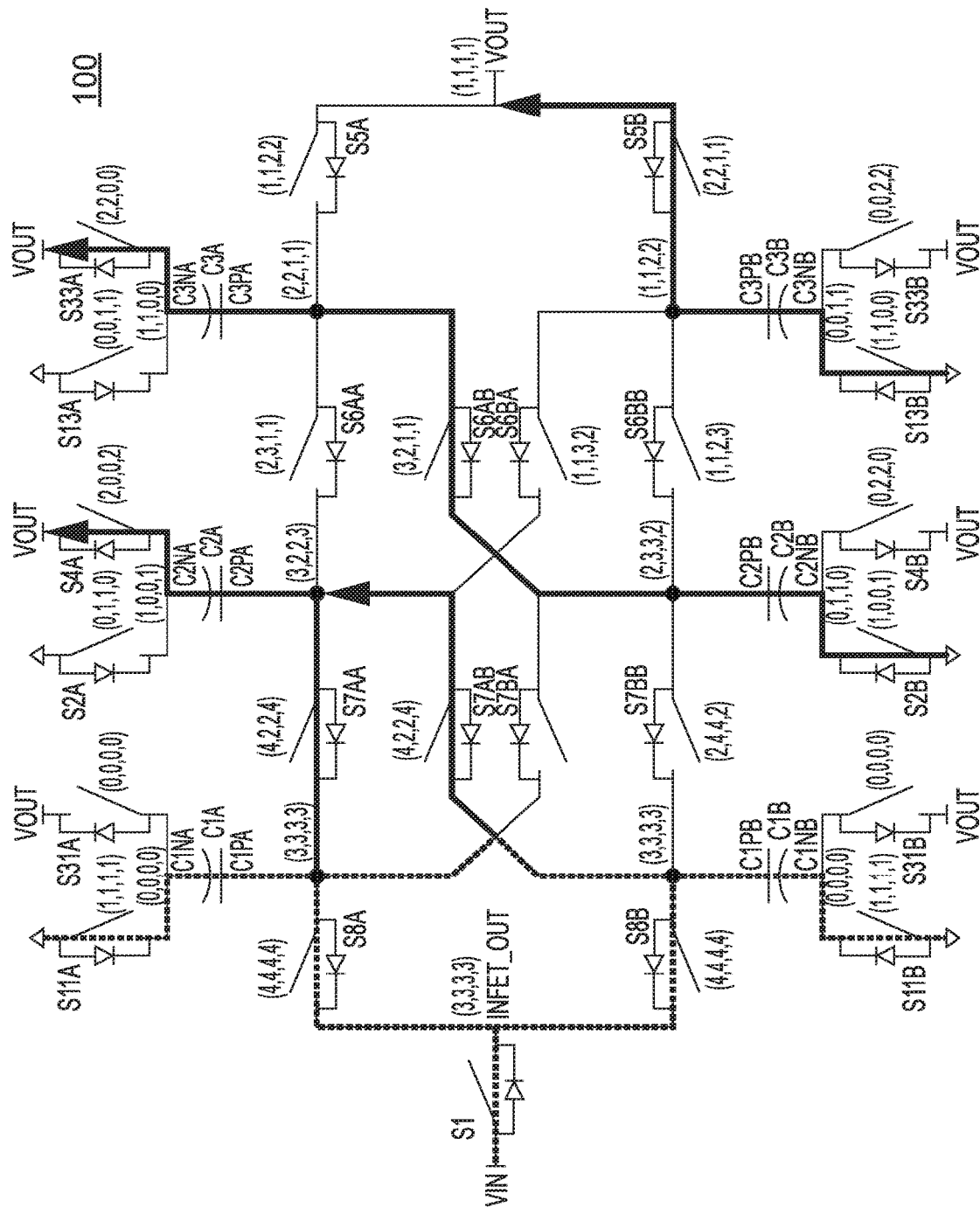
FIGS. 7-10 illustrate four phases of operation of the converter of FIG. 2 in another mode of operation.

As illustrated in FIG. 7, in phase p1a, switches S7AA and S7AB are both closed to connect the first electrode of capacitor C2A to the input voltage VIN, with the second electrode of capacitor C2A connected to VOUT by switch S4A. In this phase, the capacitor C2B provides an output to capacitor C3A of the subsequent stage, and switches S2B, S6AB and S33A are closed. Capacitor C3B provides an output to the converter output with switches S13B and S5B closed.

Figure 8:
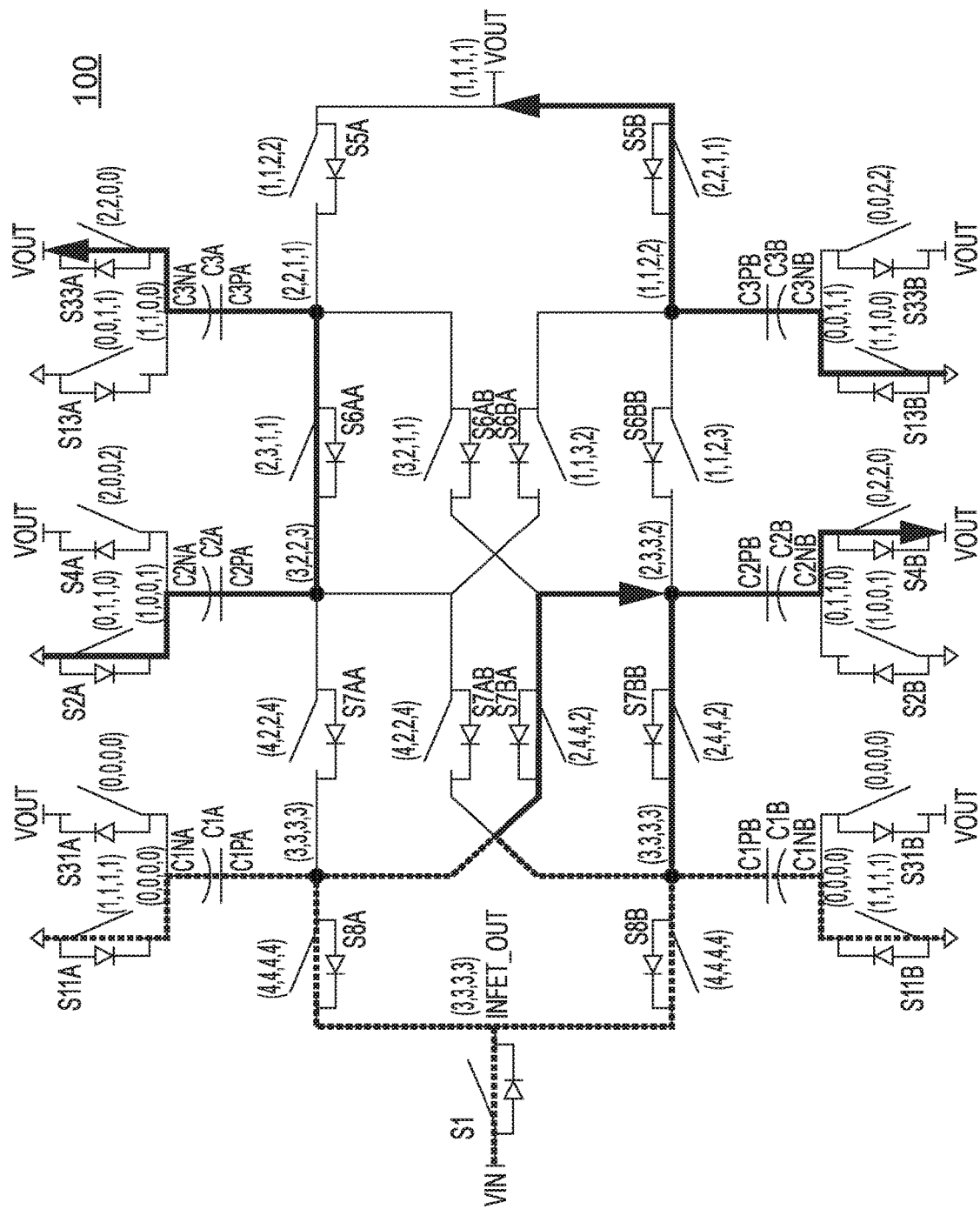

As illustrated in FIG. 8, in phase p2a, capacitor C2B is charged by the input voltage VIN, and switches S7BA and S7BB are both closed. In this phase, capacitor C2A provides an output to capacitor C3A, with switches S2A, S6AA and S33A closed. Capacitor C3B continues to provide an output to the converter output with switches S13B and S5B closed.

Figure 9:
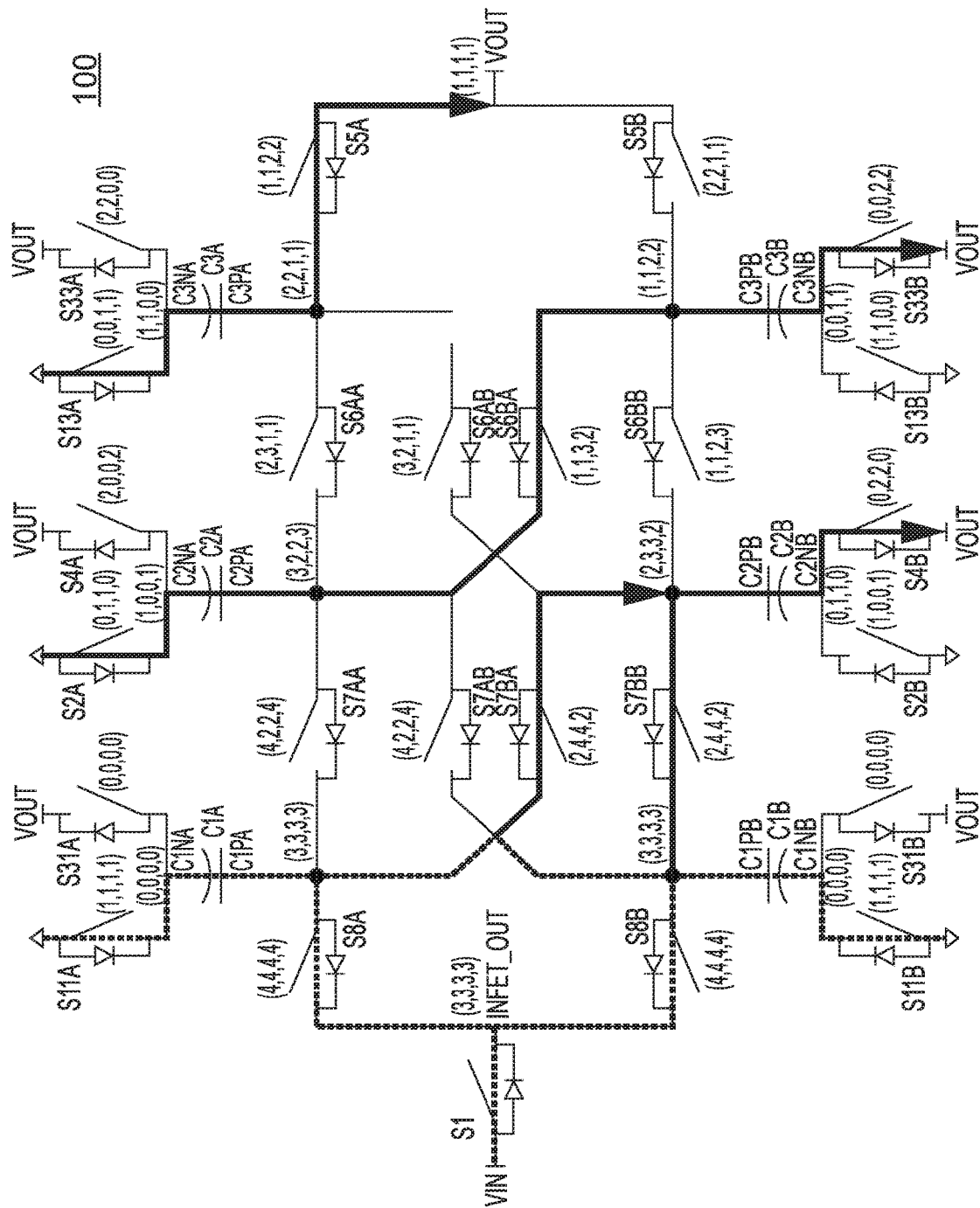

As illustrated in FIG. 9, in phase p3a, capacitor C2B continues to be charged by the input voltage VIN, and switches S7BA and S7BB are both closed. In this phase, capacitor C2A provides an output to capacitor C3B, with switches S2A, S6BA and S33B closed. In this phase, capacitor C3A provide an output to the converter output with switches S13A and S5A closed.

Figure 10:
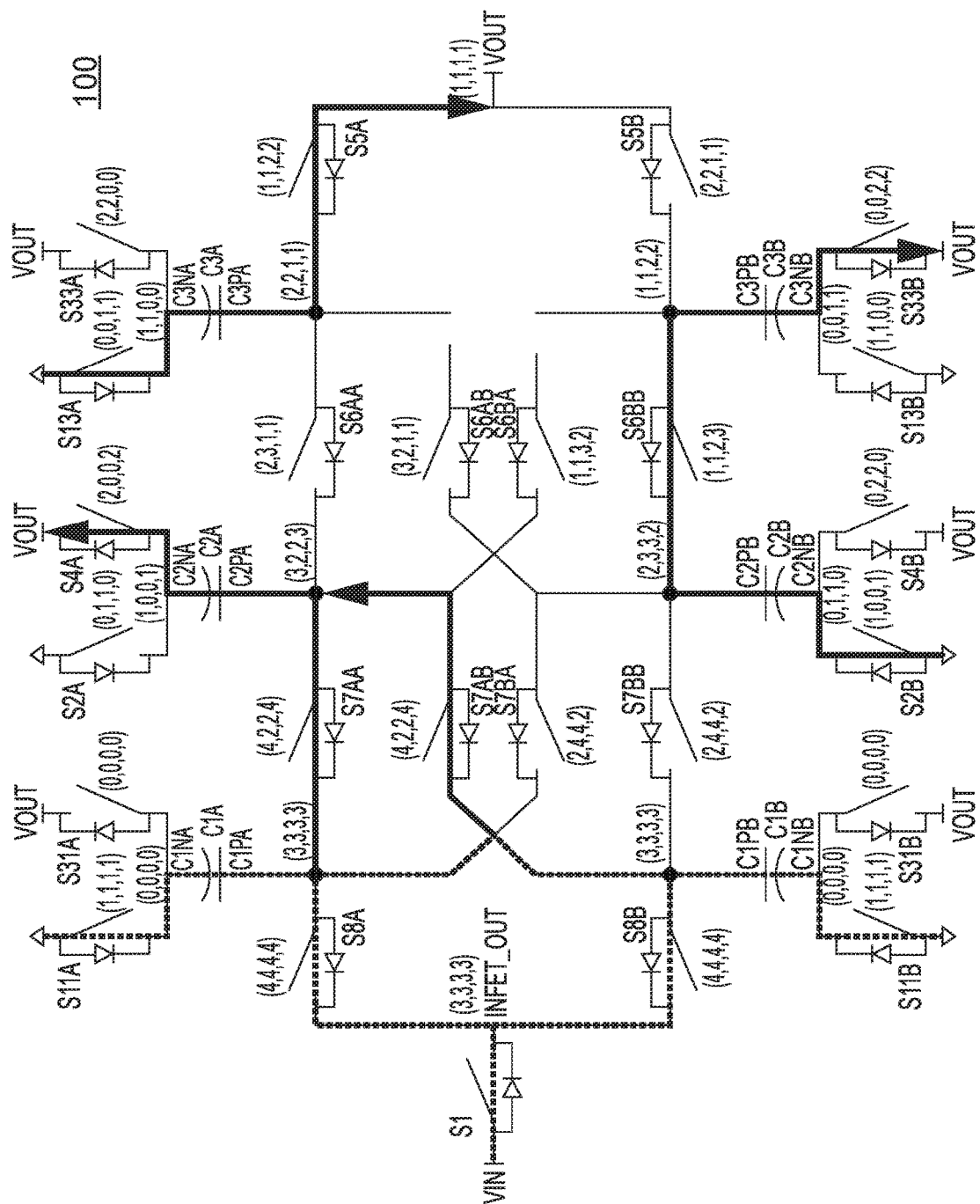

As illustrated in FIG. 10, in phase p4a, capacitor C2A is charged by the input voltage VIN, in the same arrangement as in phase p1a. In this phase, capacitor C2B provides an output to capacitor C3B, with switches S2B, S6BB and S33B closed. In this phase, capacitor C3A continues to provide an output to the converter output with switches S13A and S5A closed.

During operation, the switches of converter 100 are thus driven ON or OFF during each of phases p1a-p4a as shown in TABLE 3 below. As noted above, any suitable drive signals can be used to control the switches to be ON or OFF during any phase and, in some embodiments, when the switches are implemented using N-type MOSFETs, the switches can be driven by drive signals having values equal to the voltage multipliers shown after the colon in TABLE 3 multiplied by the value of VOUT.

TABLE 3

| Switch | p1a | p2a | p3a | p4a |
|---|---|---|---|---|
| S1 | ON:4 | ON:4 | ON:4 | ON:4 |
| S11A | ON:1 | ON:1 | ON:1 | ON:1 |

TABLE 3-continued

| Switch | p1a | p2a | p3a | p4a |
|---|---|---|---|---|
| S31A | OFF:0 | OFF:0 | OFF:0 | OFF:0 |
| S2A | OFF:0 | ON:1 | ON:1 | OFF:0 |
| S4A | ON:2 | OFF:0 | OFF:0 | ON:2 |
| S13A | OFF:0 | OFF:0 | ON:1 | ON:1 |
| S33A | ON:2 | ON:2 | OFF:0 | OFF:0 |
| S8A | ON:4 | ON:4 | ON:4 | ON:4 |
| S7AA | ON:4 | OFF:2 | OFF:2 | ON:4 |
| S6AA | OFF:2 | ON:3 | OFF:1 | OFF:1 |
| S5A | OFF:1 | OFF:1 | ON:2 | ON:2 |
| S7AB | ON:4 | OFF:2 | OFF:2 | ON:4 |
| S7BA | OFF:2 | ON:4 | ON:4 | OFF:2 |
| S6AB | ON:3 | OFF:2 | OFF:1 | OFF:1 |
| S6BA | OFF:1 | OFF:1 | ON:3 | OFF:2 |
| S8B | ON:4 | ON:4 | ON:4 | ON:4 |
| S7BB | OFF:2 | ON:4 | ON:4 | OFF:2 |
| S6BB | OFF:1 | OFF:1 | OFF:2 | ON:3 |
| S5B | ON:2 | ON:2 | OFF:1 | OFF:1 |
| S11B | ON:1 | ON:1 | ON:1 | ON:1 |
| S31B | OFF:0 | OFF:0 | OFF:0 | OFF:0 |
| S2B | ON:1 | OFF:0 | OFF:0 | ON:1 |
| S4B | OFF:0 | ON:2 | ON:2 | OFF:0 |
| S13B | ON:1 | ON:1 | OFF:0 | OFF:0 |
| S33B | OFF:0 | OFF:0 | ON:2 | ON:2 |

TABLE 4 shows example of the nominal voltages, expressed in multiples of VOUT, that can be observed at the various nodes (as labelled in FIG. 2) in converter 100 during different phases of operation in some embodiments.

TABLE 4

| Node | p1a | p2a | p3a | p4a |
|---|---|---|---|---|
| C1NA | 0 | 0 | 0 | 0 |
| C2NA | 1 | 0 | 0 | 1 |
| C3NA | 1 | 1 | 0 | 0 |
| C1PA | 3 | 3 | 3 | 3 |
| C2PA | 3 | 2 | 2 | 3 |
| C3PA | 2 | 2 | 1 | 1 |
| INFET_OUT | 3 | 3 | 3 | 3 |
| C1PB | 3 | 3 | 3 | 3 |
| C2PB | 2 | 3 | 3 | 2 |
| C3PB | 1 | 1 | 2 | 2 |
| C1NB | 0 | 0 | 0 | 0 |
| C2NB | 0 | 1 | 1 | 0 |
| C3NB | 0 | 0 | 1 | 1 |

By repeatedly operating in these four phases, the voltage converter of FIG. 2 can generate an output voltage VOUT which has a nominal value of, in this example, VIN/3, less a small amount $V_A$.

It will be seen that, in this example, the connections between the capacitors of the second and third stages, and between the capacitors of the third stage and the output, are the same as phases p1 to p4 of the 4:1 mode of operation discussed with reference to FIGS. 3 to 6. In particular, the two capacitors C2A and C2B are switched to provide multi-phase charging of the capacitors C3A and C3B of the third stage and thus provide the benefits discussed above with respect to reduced capacitor conduction losses.

As noted, in the phases of operation p1a to 4a discussed with reference to FIGS. 7 to 10, the first stage of the DC voltage converter is effectively disabled from switching, with capacitors C1A and C1B both remaining connected between the input voltage and ground in each of the four phase p1a-p4a. In other implementations, however, the first stage could be operated as an active switching stage and last stage could instead be controlled to maintain the same connection in each of the phases. For instance, if capacitors C3A and C3B were connected between the converter output and ground in each phase, i.e. with switches S5A, S5B, S13A and S13B being ON in all four phases, the capacitors C3A and C3B effectively act as an additional output capacitance. In this case, the connections between the first stage capacitors and the input VIN and between the first stage capacitors C1A and C1B and the second stage capacitors C2A and C2B may be switched in the same way as in phases p1 to p4 discussed with reference to FIGS. 3 to 6, but when capacitor C2A is switched to provide an output to the third stage, both switches S6AA and S6BA may be closed, and likewise when capacitor C2B is switched to provide an output to the third stage, both switches S6AB and S6BB may be closed.

In general, therefore one of the first or last stages can be effectively deactivated from switching and the capacitors of that stage continuously connected between the voltage input or output respectively and the defined voltage, e.g. ground. This changes the number of active charge pumping stages and provides a different conversion ratio. Thus, for the example of FIG. 2, of a DC voltage converter that comprises three stages, if all stages are active as switching stages, this can provide a 4:1 conversion mode of operation. However, one of the first or last stages can be deactivated from actively switching, so that there are just two active switching stages, to provide a 3:1 conversion mode of operation.

Additionally or alternatively, two of the stages of the converter 100 of FIG. 1 could be effectively deactivated from switching to provide a 2:1 conversion ratio. For example, the first and second stages could be deactivated, to leave the third stage as the only active switching stage, although equally the second and third stages could be deactivated to leave the first stage as the only active stage, or both the first and third stages could be deactivated to leave the second stage as the only active switching stage. In the example where the first and second stages are deactivated, switches S8A, S8B, S7AA, S7AB, S7BA, S7BB, S11A, S11B, S2A and S2B may all be continuously closed (ON) in all of the phases in the 2:1 mode of operation. In this case, as the third stage would be the single active switching stage, the flying capacitors of the active stage are selectively connected to the voltage input or the voltage output and thus there is no multi-phase charging benefit in the 2:1 conversion mode. As such the DC voltage converter may just operate in two phases. Thus, for example, in one phase capacitor C3A could be connected to be charged by the input voltage by closing switches S6AA and S6AB, and S33A, whilst capacitor C3B is connected to provide the output with switches S13B and S5B closed and in the other phase capacitor C3B could be connected to be charged by the input voltage by closing switches S6BA and S6BB, and S33B, whilst capacitor C3A is connected to provide the output with switches S13A and S5A closed.

In general, therefore, for a DC voltage converter with M individual stages, the converter may be operable in one mode, with all switching stages active to provide a conversion ratio of (M+1):1, but one or more stages may be selectively disabled from switching to provide a conversion ration of N:1 where N is an integer between 2 and M.

In some embodiments, in addition to, or instead of selectively disabling a stage from switching to provide a reconfigurable conversion ratio, two or more stages may, in a given mode of operation, be configured to be switched together. That is, one or more of the flying capacitors of one stage may be connected in parallel with one or more of the flying capacitors of an adjacent stage and switched together to be charged by the same input and to collectively provide an output. The two stages switched in this way may effectively act as single active switching stage.

Figure 11:
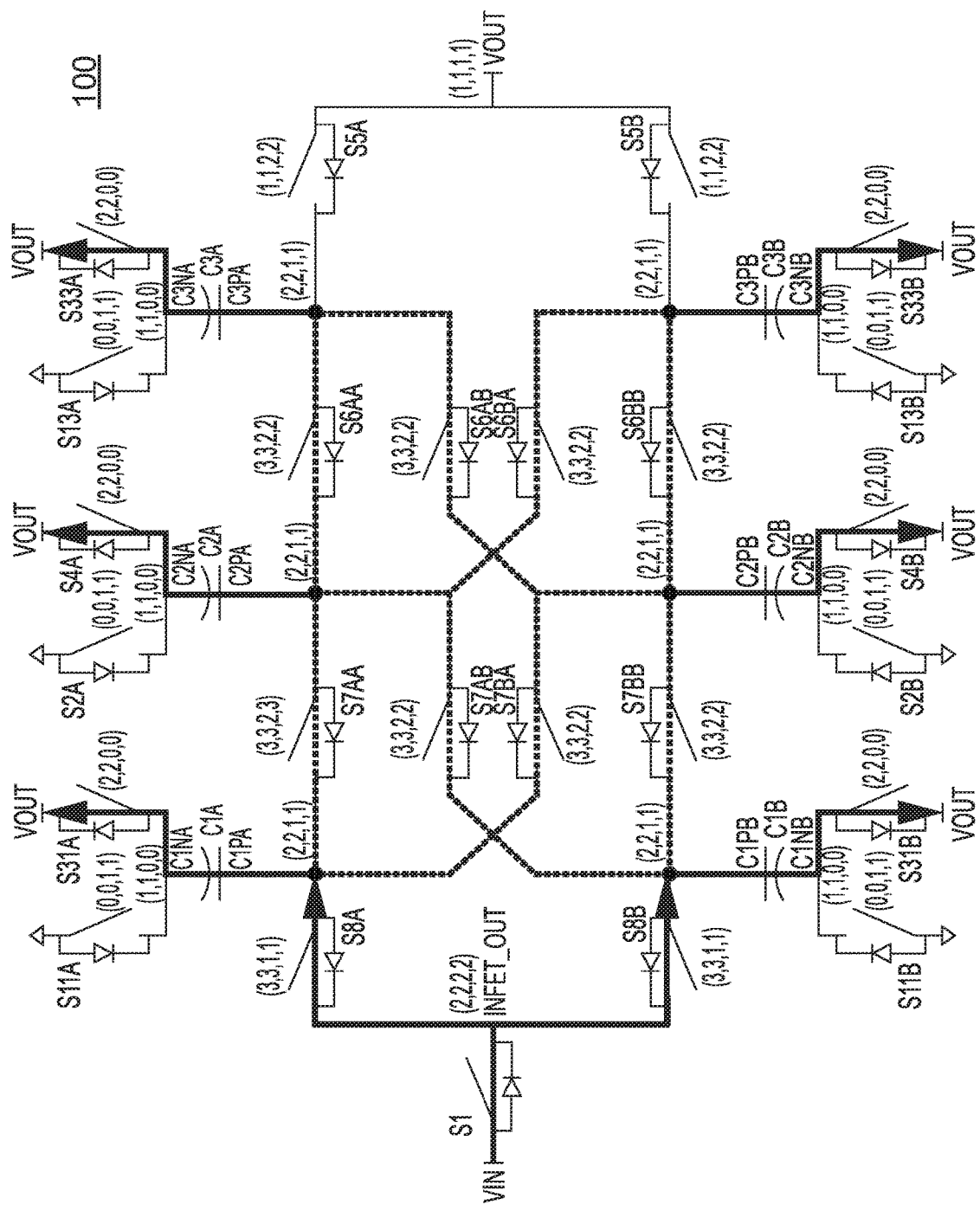
FIGS. 11-12 illustrate two phases of operation of the converter of FIG. 2 in another mode of operation.
Figure 12:
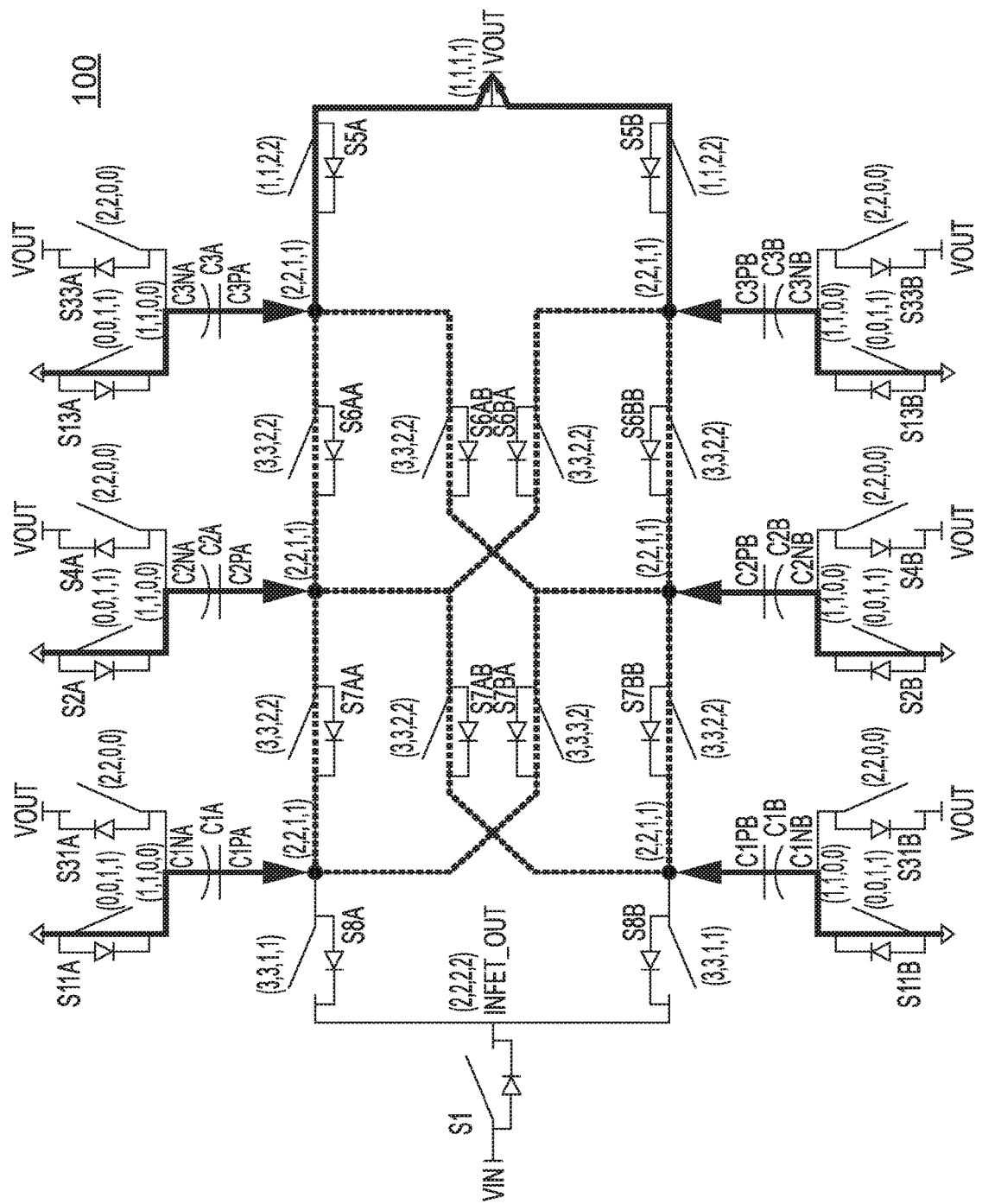

FIGS. 11 and 12 illustrate two phases p12b and p34b respectively of the DC voltage converter in a mode of operation with a 2:1 conversion ratio, i.e. for generating an output voltage equal to VIN/2 less a small voltage $V_A$, where the flying capacitors of the various stages are collectively switched together.

In this mode of operation, switches S6AA, S6AB, S6BA, S6BB, S7AA, S7AB, S7BA and S7BB are all closed throughout the whole switching cycle and thus are always ON, as illustrated by the connections shown by the dashed lines in figures. The first electrodes of the flying capacitors of all the stages are therefore connected throughout the switching cycle. The second electrodes of all the flying capacitors are, in this mode of operation, switched in phase with one another.

As illustrated in FIG. 11, in phase p12b, switches S8A and S8B are closed so as to connect the first electrodes of all the flying capacitors to the input voltage VIN, whilst switches S31A, S31B, S4A, S4B, S33A and S33B are closed to connect the second electrodes of the flying capacitors to the voltage output.

As illustrated in FIG. 12, in phase p34b, switches S5A and S5B are closed so as to connect the first electrodes of all the flying capacitors to the voltage output, whilst switches S11A, S11B, S2A, S2B, S13A and S13B are closed to connect the second electrodes of the flying capacitors to the defined voltage, i.e. ground in this example.

During operation, the switches of converter 100 are thus driven ON or OFF during each of phases p12b and p34b as shown in TABLE 5 below. As noted above, any suitable drive signals can be used to control the switches to be ON or OFF during any phase and, in some embodiments, when the switches are implemented using N-type MOSFETs, the switches can be driven by drive signals having values equal to the voltage multipliers shown after the colon in TABLE 5 multiplied by the value of VOUT.

TABLE 5

| Switch | p12b | p34b |
| --- | --- | --- |
| S1 | ON:3 | OFF:3 |
| S11A | OFF:0 | ON:1 |
| S31A | ON:2 | OFF:0 |
| S2A | OFF:0 | ON:1 |
| S4A | ON:2 | OFF:0 |
| S13A | OFF:0 | ON:1 |
| S33A | ON:2 | OFF:0 |
| S8A | ON:3 | OFF:1 |
| S7AA | ON:3 | ON:2 |
| S6AA | ON:3 | ON:2 |
| S5A | OFF:1 | ON:2 |
| S7AB | ON:3 | ON:2 |
| S7BA | ON:3 | ON:2 |
| S6AB | ON:3 | ON:2 |
| S6BA | ON:3 | ON:2 |
| S8B | ON:3 | OFF:1 |
| S7BB | ON:3 | ON:2 |
| S6BB | ON:3 | ON:2 |
| S5B | OFF:1 | ON:2 |
| S11B | OFF:0 | ON:1 |
| S31B | ON:2 | OFF:0 |
| S2B | OFF:0 | ON:1 |
| S4B | ON:2 | OFF:0 |
| S13B | OFF:0 | ON:1 |
| S33B | ON:2 | OFF:0 |

TABLE 6 shows example of the nominal voltages, expressed in multiples of VOUT, that can be observed at the various nodes (as labelled in FIG. 2) in converter 100 during different phases of operation in some embodiments.

TABLE 6

| Node | p12b | p34b |
|---|---|---|
| C1NA | 1 | 0 |
| C2NA | 1 | 0 |
| C3NA | 1 | 0 |
| C1PA | 2 | 1 |
| C2PA | 2 | 1 |
| C3PA | 2 | 1 |
| INFET_OUT | 2 | 2 |
| C1PB | 2 | 1 |
| C2PB | 2 | 1 |
| C3PB | 2 | 1 |
| C1NB | 1 | 0 |
| C2NB | 1 | 0 |
| C3NB | 1 | 0 |

By repeatedly operating in these two phases, the voltage converter of FIG. 2 can generate an output voltage VOUT which has a nominal value of, in this example, VIN/2, less a small amount $V_A$.

The switching operation of the DC voltage converter may be controlled by a suitable switch controller. The switch controller is configured to control the switching of the switches appropriately to sequence through the relevant phases to provide a desired mode of operation. As noted above, in some embodiments the DC voltage converter may be operable in different modes to provide different conversion ratios and the switch controller may control the switching of the DC voltage controller so as to implement the different modes of operation.

Figure 13:
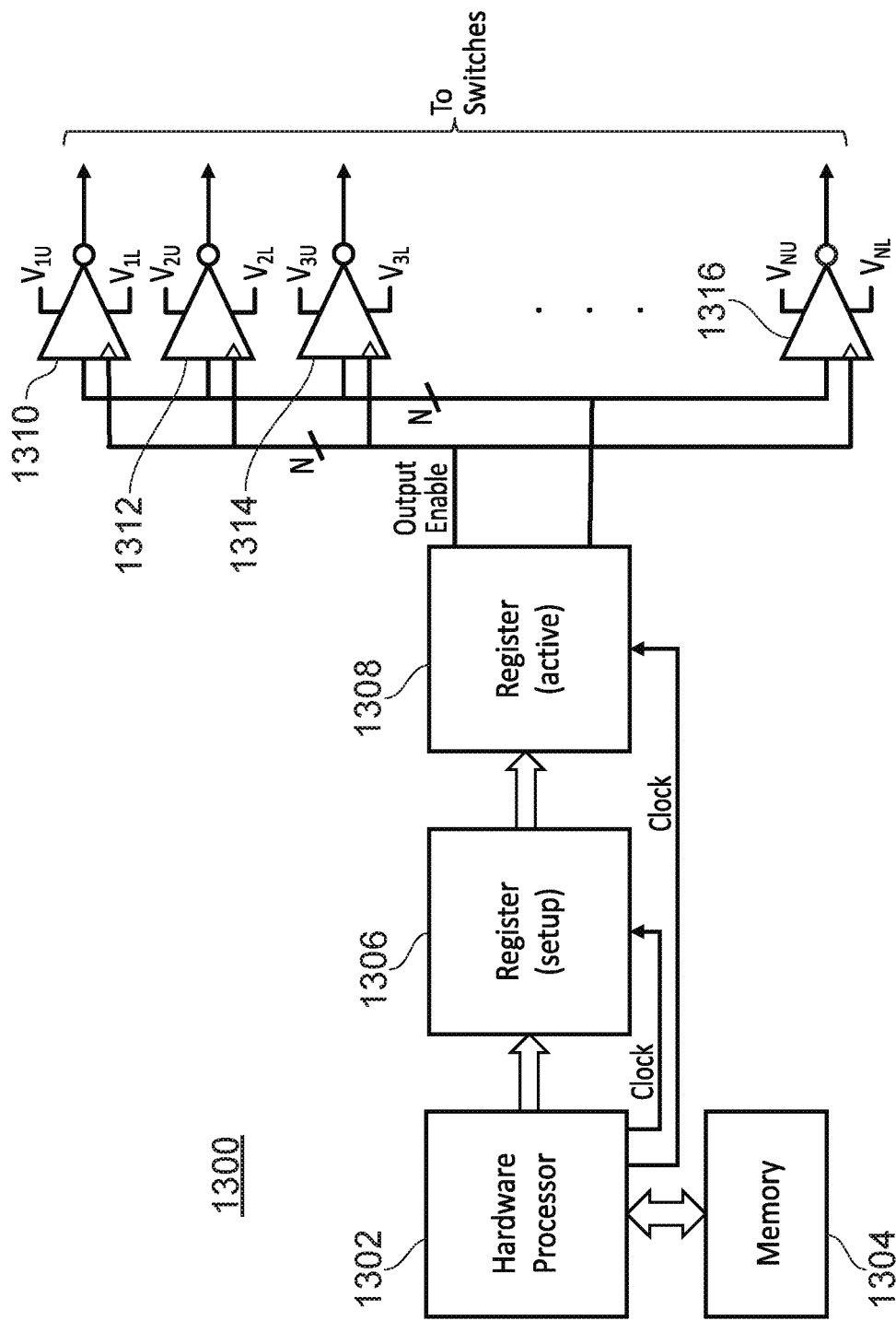
FIG. 13 illustrates an example of switch control circuitry.

Turning to FIG. 13, one example 1300 of control circuit for driving switches that can be used in DC voltage converters 100 in accordance with some embodiments is shown. As illustrated, circuit 1300, in this example, includes a hardware processor 1302, memory 1304, registers 1306 and 1308, and switch drivers, which in this case are inverters 1310, 1312, 1314, and 1316.

Hardware processor 1302 can include any suitable hardware processor, such as a microprocessor, a micro-controller, a digital signal processor, dedicated logic, and/or any other suitable circuitry. Memory 1304 can be any suitable memory and/or storage for storing data, lookup tables, programs, etc. in some embodiments. For example, memory 1304 can include random access memory, read-only memory, flash memory, hard disk storage, optical media, etc. Registers 1306 and 1308 can, in some embodiments, be any suitable devices for storing data. Register 1306 can, for example, be used for setting-up how the switches will be configured during the next phase, and register 1308 can be used to control how the switches are configured during the current phase.

Inverters 1310, 1312, 1314, and 1316 can be any suitable inverters, and any suitable number (N) of inverters can be used. In some embodiments, rather than using inverters, buffers can be used in their places. In some embodiments, the number of inverters (N) used can be equal to:

$$N = \Sigma_{i=1}^{MS} V_i$$

where MS is the total number of switches in a converter; and $V_i$ is the number of different voltage pairs that can be used to control switch i.

For example, consider S7AA. For a DC voltage converter which is operable in each of the 2:1, 3:1, and 4:1 conversion ratio modes as discussed above, switch S7AA may be controlled by voltages having the following VOUT multipliers: (1) for the 4:1 mode described with reference to FIGS. 3-6, the voltage multipliers 3, 2, 2, and 4 may be used for phases p1, p2, p3, and p4, respectively; (2) for the 3:1 mode described with reference to FIGS. 7-10, multipliers 4, 2, 2, and 4 may be used for phases p1a, p2a, p3a, and p4a, respectively; and (3) for the 4:1 mode described with reference to FIGS. 11-12, the voltage multipliers 3 and 2 may be used for phases p12b, and p34b, respectively. As such, a first inverter having an upper voltage ($V_{1U}$) of 3*VOUT and a lower voltage ($V_{1L}$) of 2*VOUT and a second inverter having an upper voltage ($V_{1U}$) of 3*VOUT and a lower voltage ($V_{1L}$) of 2*VOUT can be used to control switch S7AA. The outputs of these two inventors can both be connected to the control input (e.g., gate) of the same switch. When either of the first inverter and the second inverter is active, its output is enabled and the other inverters output is disabled.

During operation, in some embodiments, under the control of any suitable instruction, hardware processor 1302 can setup registers 1306 and 1308 to configure the drive voltages for any phase. In other words, the register can be configured to store desired data and output enable signals for the N inverters. When the time comes to switch from one phase to the next, the hardware processor can clock the data and the output enable signals from setup register 1306 to register 1308, which will then control the inverters accordingly.

The hardware processor can thus control the switch drivers, i.e. the inverters 1310-1316 in this example, to switch the relevant switches of the DC voltage converter in sequence to provide the appropriate sequence of phases for the desired operating mode. For example, in the 4:1 conversion mode discussed with respect to FIGS. 3 to 6 the converter may repeatedly cycle through the phases p1 to p4 in order and may switch from one phase to the next after any suitable period (e.g., in the range of one nanosecond to one millisecond). In some implementations, the duration of each phase, in a given mode of operation, may be same as one another, for example defined by the clock frequency. However, this need not be the case and in some implementations the durations of at least some of the phases in a sequence in a given mode of operation may be different to one another. Any given phase (e.g., phase p1, p2, p3, or p4) can begin (or end) at any suitable frequency. In other words, the cycle frequency for repeating the cycle of phases may be set to be any suitable frequency, for instance based on the clock frequency. For example, in some embodiments, this frequency can be in the range of 1 kHz to 1 GHz. In some cases, the cycle frequency could be fixed for a given mode of operation, but in some applications the cycle frequency in a given mode may vary depending on the use case and, in some cases, the cycle frequency could be dynamically varied in use.

As noted above, operation in the 4:1 mode discussed with reference to FIGS. 3-6 and the 3:1 mode discussed with reference to FIGS. 7-10 each involve a sequence of four phases, whereas operation in the 2:1 mode discussed with reference to FIGS. 11-12 involves a sequence of two phases. In some cases, to maintain a similar cycle frequency when operating in the 2:1 mode as when operating in either of the 4:1 or 3:1 modes, the duration of each of the phases p12b and p34b of the 2:1 mode may be double the duration of any of the individual phases of the 4:1 or 3:1 modes. Alternatively it can be considered that the 2:1 mode involves a sequence of 4 phases, but that the first two phases are the same as one another and the third and fourth phases are also the same as one another.

Figure 14:
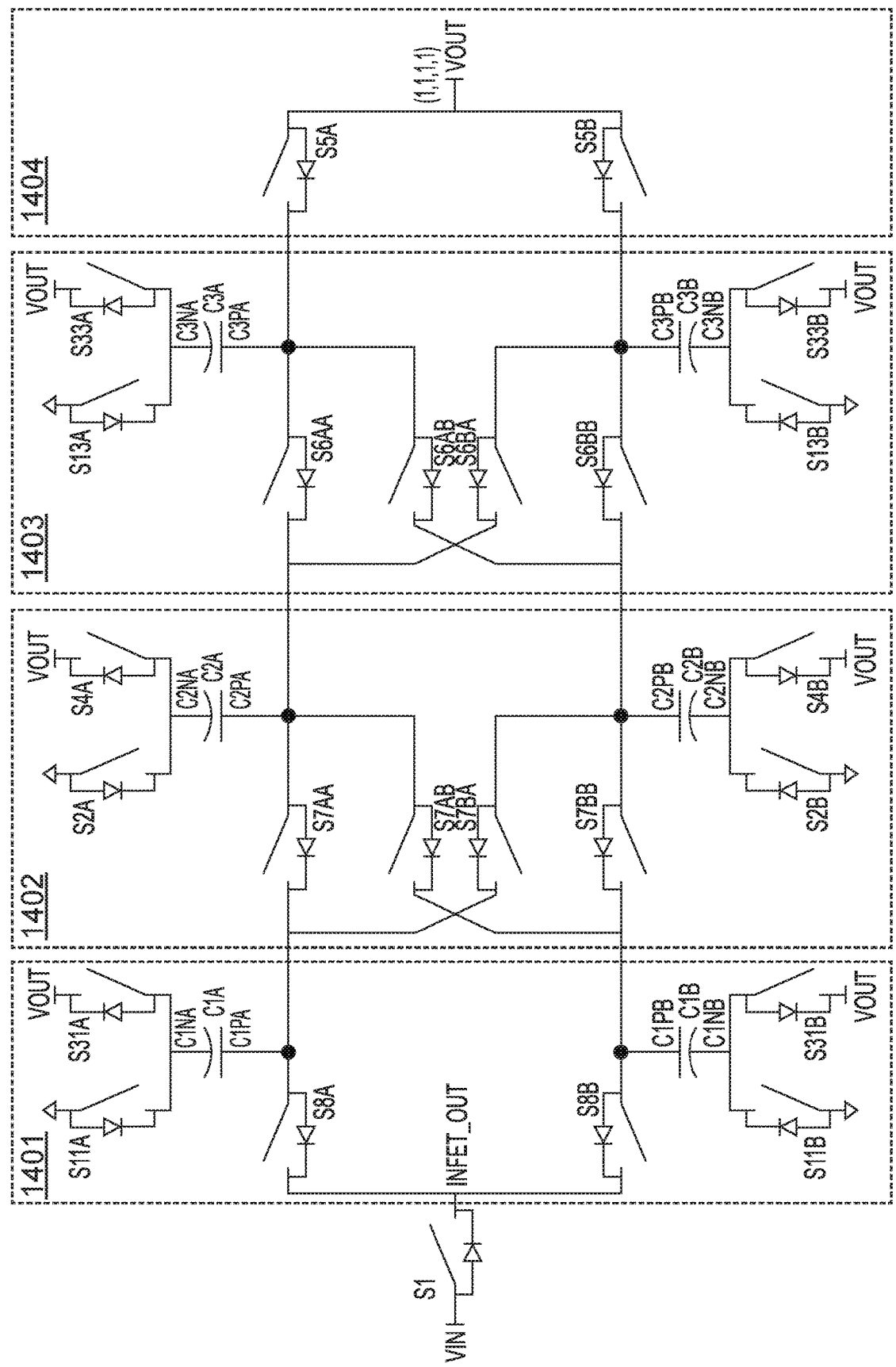
FIG. 14 illustrates functional blocks of a voltage converter according to an embodiment.

DC voltage converters according to embodiments of the disclosure can be seen as being formed from a few discrete circuit blocks with particular functions. For instance, FIG. 14 is an example of a schematic of a three stage DC voltage converter, which may thus be operable in a 4:1 conversion mode, showing different blocks of the converter. As shown, FIG. 14 includes blocks 1401, 1402-1, 1402-2, and 1403.

Block 1401 is an input charge pumping stage which includes two flying capacitors (or connections for two off chip capacitors) and switches for respectively selectively connecting first electrodes of the flying capacitors to an input voltage VIN and selectively connecting the first electrodes of the flying capacitors to either a defined voltage node, e.g. a ground node, or a node for connection to the converter output. Block 1403 is an output block, which includes only two switches and a connection to the output voltage VOUT. The output block 1403 does not thus have any flying capacitors and does not, itself, provide any charge pump capability, but is operable to select a suitable output from the preceding functional block. Blocks 1402-1 and 1402-2 (which will be identified collectively or individually by the reference 1402) include the same components as one another in the same general configuration. These blocks correspond to intermediate switching stages and thus are blocks that can be used for the second and subsequent charging pumping stages of the DC voltage converter. Each block 1402 has two inputs for connection to the first electrodes of the first and second flying capacitors respectively of the preceding block and comprises four separate switches configured such that each of the two inputs can be selectively (and independently) connected to first electrodes of either of the flying capacitors of that stage. Each block 1402 also has switches for connecting the second electrodes of the flying capacitors to either a defined voltage node, e.g. a ground node, or a node for connection to the converter output.

In some embodiments, the circuit of FIG. 14 can be used to provide a 4:1 converter, a 3:1 converter, or a 2:1 converter as described above. In some embodiments, if only a 3:1 converter and a 2:1 converter were needed, one of the blocks 1402-1 or block 1402-2 could be omitted. In some embodiments, if a 5:1 converter was desired, an additional block 1402 could be inserted, for example after block 1402-2 and before block 1403. To achieve incrementally higher conversion ratios, increments in the number of blocks can be used.

In general, therefore, embodiments of the present disclosure relates to DC voltage converters, in particular to switched capacitor voltage converters or charge pumps, comprising a plurality of stages where a flying capacitor of one stage may be used to provide charging of a flying capacitor of another stage. In embodiments of the present disclosure at least some successive stages may each comprise at least first and second flying capacitors and the switch connections between the successive stages may comprise switching paths for separately connecting each of the first and second flying capacitors of one stage to either the first or second flying capacitor of the subsequent stage. Each switching path may comprise a single switch, and thus there may be four switches, each establishing a different path between different ones of the flying capacitors of the two stages.

The switches may be controlled in a sequence of states such that a first flying capacitor of one stage is charged over at least two consecutive phases by different flying capacitors of the preceding stage at different charge levels/voltages, with the first flying capacitor being charged by capacitors at increasing charge/voltage levels in the successive phases. As discussed above, this multi-phase charging or soft-charging provides benefits in terms of reduced capacitor conduction loses compared with providing a similar amount of charge transfer from one capacitor in a single continuous charging phase.

In some embodiments, the DC voltage converter may be configured to be operable in different modes, with a different conversion ratio (between the input voltage and the nominal output voltage) in each mode. The DC voltage converter may therefore be reconfigurable to provide different conversion ratios. In at least some of the modes of operation, where there are at least two active switching stages, the DC converter may operate in a sequence of phases so as to provide multi-phase charging or soft-charging of at least one flying capacitor of at least one stage.

A DC voltage converter operable in a plurality of different modes with different conversion ratios where the converter operates with multi-phase charging represents one novel aspect of the present disclosure. Some embodiments therefore relate to DC voltage converters, in particular to switched capacitor voltage converters or charge pumps, comprising a plurality of stages where a flying capacitor of one stage may be used to provide charging of a flying capacitor of another stage and which is configured to be operable in different modes, with a different conversion ratio (between the input voltage and the nominal output voltage) in each mode. In at least one of the modes of operation a first flying capacitor of one stage is charged over at least two consecutive phases by different flying capacitors of the preceding stage at different charge levels/voltages, with the first flying capacitor being charged by capacitors at increasing charge/voltage levels in the successive phases.

In the embodiments discussed above, the DC voltage converter operates to provide a step-down conversion ratio, i.e. where the output voltage has a lower magnitude than the input voltage, and in particular where the nominal output voltage is a fraction of the input voltage. It will be understood that the same principles apply to step-up converter which generate an output voltage with a greater magnitude than the input voltage, e.g. where the nominal output voltage is a multiple of the input voltage and embodiments may thus also relate to step-up converters.

Some embodiments relate to a circuit comprising:
a first block comprising: an input node; a first switch having: a first side connected to the input node; and a second side; a first capacitor having: a first side connected to the second side of the first switch; and a second side; a second switch having: a first side connected to the second side of the first capacitor; and a second side connected to a voltage level node; a third switch having: a first side connected to the second side of the first capacitor; and a second side connected to a voltage output node; a fourth switch having: a first side connected to the input node; and a second side; a second capacitor having: a first side connected to the second side of the fourth switch; and a second side; a fifth switch having: a first side connected to the second side of the second capacitor; and a second side connected to the voltage level node; a sixth switch having: a first side connected to the second side of the second capacitor; and a second side connected to the voltage output node; a first connection node connected to the first side of the first capacitor; and a second connection node connected to the first side of the second capacitor;
a second block comprising: a third connection node connected to the first connection node; a fourth connection node connected to the second connection node;

a seventh switch having: a first side connected to the third connection node; and a second side; a third capacitor having: a first side connected to the second side of the seventh switch; and a second side; an eighth switch having: a first side connected to the second side of the third capacitor; and a second side connected to the voltage level node; a ninth switch having: a first side connected to the second side of the third capacitor; and a second side connected to the voltage output node; a tenth switch having: a first side connected to the fourth connection node; and second side; a fourth capacitor having: a first side connected to the second side of the tenth switch; and a second side; an eleventh switch having: a first side connected to the second side of the fourth capacitor; and a second side connected to the voltage level node; a twelfth switch having: a first side connected to the second side of the fourth capacitor; and a second side connected to the voltage output node; a thirteenth switch having: a first side connected to the first side of the tenth switch; and a second side connected to the second side of the seventh switch; a fourteenth switch having: a first side connected to the first side of the seventh switch; and a second side connected to the second side of the tenth switch; a fifth connection node connected to the first side of the third capacitor; and a sixth connection node connected to the first side of the fourth capacitor;

a third block comprising: a fifteenth switch having: a first side coupled to the fifth connection node; and a second side connected to the voltage output node; and a sixteenth switch having: a first side coupled to the sixth connection node; and a second side connected to the voltage output node.

The first side of the fifteenth switch may be coupled to the fifth connection node by a first connection; and the first side of the sixteenth switch may be coupled to the sixth connection node by a second connection. In some embodiments, the circuit may further comprises:

a fourth block comprising: a seventh connection node connected to the fifth connection node; a eighth connection node connected to the sixth connection node; a seventeenth switch having: a first side connected to the seventh connection node; and a second side; a fifth capacitor having: a first side connected to the second side of the seventeenth switch; and a second side; an eighteenth switch having: a first side connected to the second side of the fifth capacitor; and a second side connected to the voltage level node; a nineteenth switch having: a first side connected to the second side of the fifth capacitor; and a second side connected to the voltage output node; a twentieth switch having: a first side connected to the eighth connection node; and second side; a sixth capacitor having: a first side connected to the second side of the twentieth switch; and a second side; a twenty-first switch having: a first side connected to the second side of the sixth capacitor; and a second side connected to the voltage level node; a twenty-second switch having: a first side connected to the second side of the sixth capacitor; and a second side connected to the voltage output node; a twenty-third switch having: a first side connected to the first side of the twentieth switch; and a second side connected to the second side of the seventeenth switch; a twenty-fourth switch having: a first side connected to the first side of the seventeenth switch; and a second side connected to the second side of the twentieth switch; a ninth connection node connected to the first side of the fifth capacitor and to the first side of the fifteenth switch; and a tenth connection node connected to the first side of the sixth capacitor and to the first side of the sixteenth switch.

Embodiments may be implemented as an integrated circuit. Embodiments may be implemented in a host device, especially a portable and/or battery powered host device such as a mobile computing device for example a laptop, notebook or tablet computer, or a mobile communication device such as a mobile telephone, for example a smartphone. The device could be a wearable device such as a smartwatch. The host device could be a games console, a remote-control device, a home automation controller or a domestic appliance, a toy, a machine such as a robot, an audio player, a video player. It will be understood that embodiments may be implemented as part of a system provided in a home appliance or in a vehicle or interactive display. There is further provided a host device incorporating the above-described embodiments.

The skilled person will recognise that some aspects of the above-described apparatus and methods, for instance aspects of controlling the switching control signals to implement a given mode, may be embodied as processor control code, for example on a non-volatile carrier medium such as a disk, CD- or DVD-ROM, programmed memory such as read only memory (Firmware), or on a data carrier such as an optical or electrical signal carrier. For some applications, embodiments may be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A voltage converter comprising:
a charge pump circuit comprising a plurality of charge pump stages, each charge pump stage comprising connections for respective first and second capacitors for that stage;
the charge pump comprising a switch network, wherein the switch network comprises, between each successive stage, four switching paths for separately connecting a respective first electrode of each of the first and second capacitors of one stage to a respective first electrode of the first and second capacitors of the preceding stage, so that each of the first and second capacitors of the one stage can be selectively charged by each of the first and second capacitors of the preceding stage.

2. The voltage converter of claim 1 wherein each of said four switching paths between each successive stage comprises a single switch.

3. The voltage converter of claim 1 wherein the voltage converter is operable to repeatedly cycle through a sequence of phases such that, in one phase one of the first or second capacitors of one of the charge pump stages is charged by one of the first and second capacitors of the preceding stage at a first charging voltage and, in the next phase, is charged by the other of the first and second capacitors of the preceding stage at a second, higher, charging voltage.

4. The voltage converter of claim 1 wherein the voltage converter is operable to repeatedly cycle through a repeating sequence of phases comprising:
   a first phase in which the first capacitor of one of the charge pump stages is charged by the second capacitor of the preceding stage and the second capacitor of that one charge pump stage provides an output for that one stage, whilst the first capacitor of the preceding stage is charged by an input to that preceding stage;
   a second phase in which the first capacitor of said one charge pump stage provides an output for that one charge pump stage and the second capacitor of that one charge pump stage is charged by the second capacitor of the preceding stage, whilst the first capacitor of the preceding stage is charged by an input to that preceding stage;
   a third phase in which the first capacitor of said one charge pump stage provides an output for that one charge pump stage and the second capacitor of that one charge pump stage is charged by the first capacitor of the preceding stage, whilst the second capacitor of that preceding stage is charged by an input to that preceding stage; and
   a fourth phase in which the first capacitor of said one charge pump stage is charged by the first capacitor of the preceding stage and the second capacitor provides an output for that one charge pump stage, whilst the second capacitor of that preceding stage is charged by an input to that preceding stage.

5. The voltage converter of claim 1 wherein the number of charge pump stages is M and the voltage converter is configured to be operable in a first mode of operation to provide a conversion ratio between an input voltage and an output voltage of (M+1):1 or 1:(M+1).

6. The voltage converter of claim 5 wherein the voltage converter is further configured to be operable in one or more additional modes of operation, with different conversion ratios in said different modes.

7. The voltage converter of claim 6 wherein the conversion ratio in the or each of said one or more additional modes is X:1 or 1:X where X is an integer between 2 and M.

8. The voltage converter of claim 6, wherein, in the first mode of operation the voltage converter is configured to cycle through a repeated sequence of four phases at first cycle frequency and wherein in one of said additional modes of operation, with a conversion ratio of 2:1 or 1:2, the voltage converter is configured to cycle through a repeated sequence of two phases at said first cycle frequency.

9. The voltage converter of claim 6, wherein the voltage converter is configured, such that, in one of said one or more additional modes of operation, the voltage converter is operable in a sequence of phases and the first and second capacitors of at least one of the charge pump stages are connected in connection paths that do not vary throughout said sequence of phases.

10. The voltage converter of claim 6, wherein the voltage converter is configured, such that, in one of said one or more additional modes of operation, the voltage converter is operable in a sequence of phases and at least two of the charge pump stages are connected in each of the phases so that the respective first and second capacitors of those phase are connected in parallel throughout said sequence of phases.

11. The voltage converter of claim 5 further comprising a switch controller for controlling switching of the switch network to implement a mode of operation.

12. The voltage converter of claim 1 wherein the switch network further comprises:
   first and second input switches for selectively connecting a voltage input to the first electrodes of the first and second capacitors respectively of a first one of the plurality of charge pump stages; and
   first and second output switches for selectively connecting the first electrodes of the first and second capacitors respectively of a last one of the plurality of charge pump stages to a voltage output.

13. The voltage converter of claim 12 wherein the switch network further comprises respective switches for selectively connecting a second electrode of each of the first and second capacitors of each of the plurality of stages to either of a first node at a defined voltage or to a second node which is coupled to one of the voltage input or the voltage output.

14. The voltage converter of claim 1 further comprising said first and second capacitors of each charge pump stage.

15. The voltage converter of claim 1 implemented as an integrated circuit.

16. An electronic device comprising the voltage converter of claim 1.

* * * * *